United States Patent
Anderson et al.

(10) Patent No.: US 8,653,174 B2
(45) Date of Patent: Feb. 18, 2014

(54) AMBIENT TEMPERATURE CURABLE ISOCYANATE-FREE COMPOSITIONS FOR PREPARING CROSSLINKED POLYURETHANES

(75) Inventors: Jeffrey R. Anderson, Midland, MI (US); John N. Argyropoulos, Midland, MI (US); Debkumar Bhattacharjee, Blue Bell, PA (US); Paul Foley, Midland, MI (US); Gary E. Spilman, Midland, MI (US); Huiqing Zhang, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 163 days.

(21) Appl. No.: 13/160,604

(22) Filed: Jun. 15, 2011

(65) Prior Publication Data

US 2011/0313091 A1    Dec. 22, 2011

Related U.S. Application Data

(60) Provisional application No. 61/355,266, filed on Jun. 16, 2010.

(51) Int. Cl.
*C08G 8/04*       (2006.01)
*C08G 12/04*      (2006.01)
*C08L 75/10*      (2006.01)
*C08K 5/05*       (2006.01)

(52) U.S. Cl.
USPC ............ 524/391; 528/245; 524/598; 524/597

(58) Field of Classification Search
USPC .......................................... 525/472
See application file for complete search history.

(56) References Cited

U.S. PATENT DOCUMENTS

| | | | |
|---|---|---|---|
| 4,235,766 A * | 11/1980 | Kuijper | 524/875 |
| 5,336,566 A | 8/1994 | Rehfuss | |
| 5,356,669 A | 10/1994 | Rehfuss et al. | |
| 6,177,514 B1 | 1/2001 | Pathak et al. | |
| 6,252,121 B1 | 6/2001 | Argyropoulos et al. | |
| 6,265,028 B1 * | 7/2001 | Zhao et al. | 427/372.2 |
| 6,541,594 B2 | 4/2003 | Ohrbom et al. | |
| 6,812,316 B2 * | 11/2004 | Ohrbom et al. | 528/45 |
| 6,962,730 B2 | 11/2005 | Ohrbom et al. | |
| 7,423,077 B2 * | 9/2008 | Wilke et al. | 524/100 |
| 7,442,325 B2 | 10/2008 | Lin et al. | |
| 2006/0155095 A1 | 7/2006 | Daussin et al. | |
| 2010/0179272 A1 | 7/2010 | Balzarek et al. | |
| 2010/0256292 A1 | 10/2010 | Jakob et al. | |

FOREIGN PATENT DOCUMENTS

| | | | |
|---|---|---|---|
| WO | 9529947 A1 | 11/1995 | |
| WO | WO 2009000379 A1 * | 12/2008 | C08F 8/28 |
| WO | 2009009271 A2 | 1/2009 | |

OTHER PUBLICATIONS

DE 2810428 CAS Abstract.*
NL7710099 CAS Abstract.*

* cited by examiner

*Primary Examiner* — Randy Gulakowski
*Assistant Examiner* — Christopher M Rodd
(74) *Attorney, Agent, or Firm* — Andrew E. C. Merriam

(57) ABSTRACT

The present invention provides a multicomponent composition that is substantially isocyanate-free and comprises a polycarbamate as a first component and a polyaldehyde or an acetal or hemiacetal thereof as a second component and further comprises an effective amount of a triggering agent such that the first and second components to cure at a temperature of from 0C to less than 80C to form a crosslinked polyurethane. The multicomponent composition forms an ambient temperature curable composition when all of its components are combined that has a pH of 7.0 or less. The present invention also provides processes crosslinked polyurethanes, and the crosslinked polyurethanes prepared by the processes.

9 Claims, No Drawings

AMBIENT TEMPERATURE CURABLE ISOCYANATE-FREE COMPOSITIONS FOR PREPARING CROSSLINKED POLYURETHANES

This application claims the benefit of priority under 35 U.S.C. §119(e) of U.S. Provisional Patent Application No. 61/355,266 filed on Jun. 16, 2010.

The present invention generally relates to crosslinked polyurethanes from substantially isocyanate free multicomponent compositions and related compositions, processes, articles, and other related inventions.

Polyurethanes comprise repeat units that contain carbamate groups of formula (A): —O—C(=O)—N<(A). The polyurethanes can be characterized as being linear or branched, non-crosslinked or crosslinked, or a combination thereof. Polyurethanes have found many uses in chemical and allied industries. Examples of such uses are in preparing coatings, sealants, and adhesives. Polyurethanes are also especially useful in articles comprising cast parts (e.g., automobile bumpers), foams, and elastomeric fibers.

A polyurethane typically is prepared by curing a mixture of two reactants, which react together to produce the polyurethane. The reaction is believed to be via a step-growth polymerization mechanism. The reaction can be carried out in an inert liquid that functions as a solvent. Typically the reaction between the reactants is initiated by exposing their mixture to at least one of heat, moisture, a curing catalyst, or a combination thereof. Intermediates formed during the step-growth polymerization should be sufficiently soluble in the solvent (i.e., should not precipitate or crystallize therefrom) so as to allow the step-growth polymerization to proceed to an extent necessary for producing the polyurethane with a desired molecular weight.

The reactants used to prepare the polyurethane in the curing step can have different structures and thus their respective reactions produce different structures of the polyurethanes. The curing step of a preparation of the polyurethane can be broadly characterized by types of structures of the complimentary-reacting functionalized reactants as being either isocyanate-based or so called "isocyanate-free."

The isocyanate-based polyurethane preparation chemistries have their drawbacks. For example, there are environmental and health concerns associated with preparation and use of polyisocyanate compounds and curable compositions containing same, and with the curing steps of the isocyanate-based polyurethane preparations. That is why the most sought after but heretofore elusive goal in the polyurethane art has been discovery of a viable isocyanate-free polyurethane preparation, especially a room temperature curable one.

Examples of isocyanate-based or isocyanate-free polyurethane preparations fall short of this goal are known from, for example, U.S. Pat. Nos. 5,356,669; 6,541,594 B2. 5,356,669 discloses polyurethanes based on reaction products of (a) a first component comprising a polymer backbone having appended thereto at least one carbamate group, and (b) a second component comprising a compound having a plurality of groups that are reactive with said carbamate group. U.S. Pat. No. 6,541,594 B2 discloses coating compositions comprising a reactive component (a) which is substantially free of any heteroatoms and is not a crystalline solid at room temperature and which comprises from (i) 12 to 72 carbon atoms, and at least two functional groups (ii), and (b) a crosslinking agent comprising a plurality of functional groups (iii) reactive with the functional groups (ii) of compound (a), wherein functional groups (ii) and (iii) are selected such that reaction there between produces a thermally irreversible chemical linkage.

U.S. Pat. No. 7,442,325 B2 discloses aminoplast-based crosslinking compositions and their method of preparation. The compositions are useful as crosslinking agents in curable compositions that contain materials or polymers having active hydrogen groups. U.S. Pat. No. 7,442,325 B2 does not disclose preparing a crosslinked polyurethane with the active hydrogen-containing material of the curable compositions.

The isocyanate-free polyurethane chemistries developed in the prior art have drawbacks, such as, for example, the prior art isocyanate-free polyurethane preparations historically must be cured at curing temperatures above 80 degrees Celsius (° C.) to achieve effective curing to give the crosslinked polyurethane. The high cure temperature deficiency of prior art isocyanate-free polyurethane preparations prevents them from being used in floor, furniture, automotive, industrial maintenance and certain adhesive applications requiring curing at ambient temperatures, especially room temperature (e.g., 20° C. to 30° C.). Further, the known isocyanate-free polyurethane preparations typically produce unwanted volatile organic compound (VOC) byproducts and contain residual amounts of formaldehyde, which can be harmful to the environment and people exposed thereto. Also, the prior art water-based polyurethane preparations typically have prepared polyurethanes that are naturally hydrophilic materials (e.g., naturally hydrophilic coatings), materials susceptible to deterioration by an organic solvent (e.g., methyl ethyl ketone (MEK)), materials lacking sufficient hardness, or a combination thereof. Such polyurethanes are believed to have relatively low levels of crosslinking and provide water-sensitive products resulting from the hydrophilic nature of the ingredients that have been employed to make the prior art polyurethanes, or both.

The present invention seeks to solve the problem of providing a substantially isocyanate-free composition that is ambient temperature curable and which gives crosslinked polyurethanes having higher levels of crosslinking to improve performance characteristics or properties.

STATEMENT OF THE INVENTION

The present invention includes a substantially isocyanate-free multicomponent composition, ambient temperature curable composition made from the multicomponent composition, to processes for using the multicomponent composition to prepare an ambient temperature curable composition and curing it at a temperature of 80° C. or less to prepare crosslinked polyurethanes, and to crosslinked polyurethanes prepared by the processes. The crosslinked polyurethanes of the present invention, even those produced by curing at room temperature, have a high degree of crosslinking.

In accordance with the present invention, a substantially isocyanate-free multicomponent composition comprises a polycarbamate as a first component and a polyaldehyde or an acetal or hemiacetal thereof as a second component, wherein the multicomponent composition further comprises an effective amount of a triggering agent such that the first and second components when combined form a composition that reacts to cure at a temperature of from 0° C. to less than 80° C. to form a crosslinked polyurethane, and, further wherein, the composition resulting when all components of the multicomponent composition are combined has a pH of 7.0 or less. The first component and second component, when combined and cured form a crosslinked polyurethane.

Preferably, the multicomponent composition and the ambient temperature curable composition made therefrom are substantially formaldehyde free. Such compositions are substantially free of resins made from formaldehyde, such as aminoplasts and phenol or resole formaldehyde condensates.

Preferably, in the first component of the multicomponent composition of the present invention, the polycarbamate has an average of 2.5 or more, or, more preferably, 3.0 or more carbamate functional groups, such as up to 100, or, preferably, up to 20 carbamate functional groups.

Preferably, in the first component of the composition of the present invention, the polycarbamate is, for example, the condensation product of one or more polyols with an unsubstituted carbamic acid alkyl ester or urea. Suitable polyols may include, for example, an acrylic, saturated polyester, alkyd, polyether or polycarbonate polyol. More preferably, the polycarbamate has carbamate groups and hydroxyl groups in a ratio of the equivalents of carbamate groups to the number of equivalents of hydroxyl functional groups of from 1:1 to 20:1 or, preferably, 5.5:4.5 or higher, or, preferably, up to 10:1. Such a ratio can be determined by dividing the average number of carbamate functional groups by the average number of hydroxyl functional groups in the polycarbamate. The term "average number of hydroxyl functional groups in the polycarbamate" is the average number of hydroxyl groups left in the polycarbamate after it is made from a polyol and means the number determined by hydroxyl titration of the polycarbamate to determine its hydroxyl number, followed by calculation of the number of hydroxyl groups reacted to form carbamate groups in making the polycarbamate from a polyol by comparing the hydroxyl number to the initial number of hydroxyl groups in the polyol.

In the second component of the multicomponent composition of the present invention, the polyaldehyde, acetal or hemiacetal thereof preferably has a solubility in water of from 0.015 to 0.20 gram of polyaldehyde per milliliter of water at 25° C., preferably, up to 0.15 gram, or, preferably, 0.03 gram or more. Less preferred are more water soluble polyaldehydes, such as glyoxal or glutaraldehyde.

Preferably, the polyaldehyde is chosen from a $C_5$ to $C_{11}$ alicyclic or aromatic dialdehyde, or, more preferably, a $C_6$ to $C_{10}$ alicyclic or aromatic dialdehyde, such as, for example, (cis,trans)-1,4-cyclohexanedicarboxyaldehydes, (cis,trans)-1,3-cyclohexanedicarboxyaldehydes and mixtures thereof.

In the multicomponent composition of the present invention, the triggering agent may be an acid with a pKa of less than 6.0.

Preferably, to increase the pot-life of the composition, the multicomponent composition of the present invention further comprises a curing inhibitor. The curing inhibitor is volatilized from the composition under ambient cure conditions. Preferably, the curing inhibitor is chosen from water, an alcohol or a mixture thereof, such as, for example a primary or secondary alcohol.

Preferably, to increase the flexibility, adhesion, or both of a cured and dried coating prepared therefrom, the multicomponent composition of the present invention further comprises from 3 to 20 wt. %, based on the total weight of solids in the composition, of a pigment, such as, for example, $TiO_2$.

In another aspect, in accordance with the present invention, processes for preparing a crosslinked polyurethane comprise mixing a polycarbamate first component and a polyaldehyde or an acetal or hemiacetal thereof second component to form a substantially isocyanate-free ambient temperature curable composition having a pH of 7.0 or less, and curing the resulting composition at a temperature of from 0° C. to less than 80° C., wherein the ambient temperature curable composition has an effective amount of a triggering agent.

The processes of the present invention can be used to provide coatings or coated substrates comprising crosslinked polyurethanes.

Preferred crosslinked polyurethanes have at least one geminal bis(urethane) group.

The present invention further provides methods for preparing a crosslinked polyurethane comprising mixing the components of the multicomponent composition together to form an ambient temperature curable composition and curing the resulting composition at a curing temperature of less than 80° C. so as to prepare a crosslinked polyurethane.

The present invention still further provides crosslinked polyurethanes prepared by the methods of the present invention.

The first component and second component, and any other component of the multicomponent composition of the present invention may be mixed to prepare an ambient temperature curable composition substantially free of isocyanate groups, the multicomponent composition comprising a polycarbamate first component and a polyaldehyde second component; wherein the polyaldehyde exhibits a solubility in water of less than 0.15 gram of polyaldehyde per milliliter of water at 25° C.; and wherein the multicomponent composition is characterizable as being curable, at a curing temperature of 24° C., with an effective amount of a triggering agent so as to form a crosslinked polyurethane.

As used herein, the term "adhesive" is synonymous with "glue," "mucilage," "mastic" and "cement" and means a substance capable of fastening two materials together by means of surface attachment, wherein the two materials are the same or different. The term "ambient temperature" or "ambient cure conditions" means a temperature of from 0° C. to less than 80° C. at standard pressure.

As used herein, the term "ambient temperature curable" means capable of reacting in a chemically transforming process at from 0° C. to less than 80° C.

As used herein, the term "article" means an individual object or item. The article can be in any shape, form, and size, and comprised of any glass or solid material.

As used herein, the term "crosslinked polyurethane" means a polymeric substance comprising two adjacent molecular backbones, each of which independently contains a plurality of repeat units, each repeat unit independently comprising a connecting carbamate diradical, or any two adjacent repeat units together comprising a connecting carbamate diradical, or a combination thereof; wherein the adjacent molecular backbones are covalently bonded together via at least one covalent bond of the connecting carbamate diradical, thereby covalently bonding the adjacent molecular backbones together so as to form a single crosslinked polyurethane molecule. The connecting carbamate diradical is described later.

As used herein, the term "carbamate diradical" means a

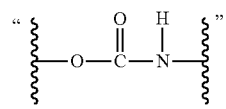

group.

As used herein,

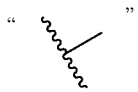

(or an end "-" taken in context) indicates a radical. Each of the covalently bonded adjacent molecular backbones independently is linear or branched and independently contains zero, one, or more cyclic groups, including aromatic groups. Each molecular backbone can be covalently bonded to one or more other molecular backbones.

As used herein, the term "curing" means subjecting to conditions effective for chemically transforming or chemically transforming under such conditions.

As used herein, the term "curing temperature" means a degree of hotness or coldness effective for chemically transforming the invention ambient temperature curable composition to the invention crosslinked polyurethane.

As used herein, the term "effective amount of a pigment" means from 1 wt. % to 25 wt %, based on the total weight of solids in the composition, preferably, 3 wt. % or more, e.g., from 3 wt % to 20 wt %, or, more preferably, 5 wt. % or more, or up to 15 wt. %, or up to 8 wt. %.

As used herein, the term "polyaldehyde" means a molecule containing two or more aldehyde groups or their hydrates, or their acetals or hemiacetals, wherein the molecule is capable of performing as described herein and is capable of reacting with the polycarbamate during the invention curing step so as to form the invention crosslinked polyurethane. The aldehyde group can be written herein as —C(=O)H or —CHO. The term "polyaldehyde" is not used herein to mean a polymeric substance made by self-polymerizing an aldehyde monomer.

Unless otherwise noted herein, the term "carbamate group" means a radical structure of formula

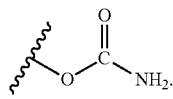

As used herein, the term "multicomponent composition" means a composition comprising two or more components, each one having at least one ingredient.

As used herein, the term "polycarbamate" means a molecule containing two or more carbamate groups (H2NC(O)O—), wherein the molecule is capable of reacting with the polyaldehyde during the invention curing step so as to form the invention crosslinked polyurethane.

As used herein, the term "polyol" means an organic molecule having at least 2 —OH functionalities.

As used herein, the term "polyester polyol" means a subclass of polyol that is an organic molecule having at least 2 alcohol (—OH) groups (preferably including alpha,omega —OH) and at least one carboxylic ester ($CO_2$—C) functionality. The term "alkyd" means a subclass of polyester polyol that is a fatty acid-modified polyester polyol wherein at least one carboxylic ester functionality is preferably derived from an esterification reaction between an alcoholic —OH of the polyol and a carboxyl of a ($C_8$-$C_{60}$) fatty acid.

As used herein, the phrase "react together" means creating one or more covalent bonds between two or more molecules, or portions thereof.

As used herein, the term "solids in the composition" refers to resins, reactants and all non-volatile additives or ingredients, including catalysts.

As used herein, the term "solubility in water" means determining an extent of dissolution in a liquid of molecular formula $H_2O$ by following ASTM E1148-02 (Standard Test Method for Measurements of Aqueous Solubility (2002)).

As used herein, the term "substantially free of isocyanate groups" or "substantially isocyanate-free" isocyanate groups means having less than 5 mole percent (mol %) of —N=C=O groups (i.e., isocyanate groups) based on total moles of carbamate groups plus isocyanate groups in the composition, preferably, less than 3 mol %, or, more preferably, less than 1 mol %, and, still more preferably, less than 0.1 mol %.

Unless otherwise stated, items in parentheses refer to the term both with and without parenthesis. Thus, for example, "(poly)isocyanate" means either polyisocyanate or isocyanate.

Unless otherwise stated, all units of pressure and temperature refer to standard pressure and room temperature.

The multicomponent composition of the present invention is mixed to prepare the ambient temperature curable composition of the present invention. The methods of using the ambient temperature curable composition of the present invention are useful for preparing the crosslinked polyurethane of the present invention. The crosslinked polyurethane of the present invention is useful as an adhesive, coating, or sealant. The adhesive, coating, or sealant of the present invention is useful for preparing an article comprising the same.

The methods of the present invention comprise mixing the multicomponent composition to form an ambient curable composition and curing the ambient temperature curable composition, thereby producing the invention crosslinked polyurethane containing a high degree of crosslinking and, thus, one or more improved properties such as, for example, improved water resistance, improved deterioration resistance to methyl ethyl ketone (MEK) rubs, increased hardness, improved cross-hatch adhesion, or a combination thereof. The only byproduct produced by such curing step is water. As used herein, the term "byproduct" means a substance or molecule that is produced from a reaction as a natural consequence of the intended chemical transformation (e.g., release of a molecule of water in a chemical transformation involving a dehydration). In contrast, the term "side product" means an unintended substance or molecule that is produced from a reaction (e.g., due to a side reaction between two or more molecules of one of the reactants of a reaction employing two or more different reactants or due to decomposition of a reactant or product). These advantages mean that the invention can be employed in isocyanate-free, low temperature curing commercial applications that heretofore were unattainable by prior art approaches, which produced unsuitably low levels of crosslinking, unacceptable levels of volatile organic compound (VOC) byproducts, or both, and/or required unsuitably high curing temperatures.

The inventors have formed a new class of crosslinked polyurethanes by reacting a polyaldehyde with a polycarbamate at a pH of ≤7.0, such as those having geminal bis(urethane) groups. In forming such crosslinked polyurethanes, polyaldehydes having a greater extent of water solubility (i.e., water solubility of 0.2 g/mL or greater) are less preferred and react with polycarbamates to prepare polyurethanes and coatings prepared therefrom that have a less desirable water resistance. Further, the inventors have discovered that polyaldehydes having a low water solubility (i.e., having the solubility in water of less than 0.15 g/mL) are more desirable and effective for preparing the crosslinked polyurethanes of the present invention. The inventors also discovered that the crosslinked polyurethanes of the present invention can be used to prepare robust invention crosslinked polyurethane coatings having resistance to wear and water resistance. The advantageous properties of the crosslinked polyurethane of the present invention apply to their use as the invention coatings, sealants or adhesives; and to their use in preparing the invention manufactured articles.

The present invention includes the multicomponent composition, ambient temperature curable isocyanate-free composition, processes for using the multicomponent composition to prepare the ambient temperature curable isocyanate-free composition and for using the ambient temperature curable isocyanate-free composition to prepare crosslinked polyurethanes, crosslinked polyurethanes prepared by the later process, and related inventions (e.g., kits for preparing crosslinked polyurethanes and articles comprising the crosslinked polyurethanes), all as summarized above.

In the present application, any lower limit of a range of numbers, or any preferred lower limit of the range, may be combined with any upper limit of the range, or any preferred upper limit of the range, to define a preferred aspect or embodiment of the range. Each range of numbers includes all numbers, subsumed within that range (e.g., the range from 1 to 5 includes, for example, 1, 1.5, 2, 2.75, 3, 3.80, 4, and 5).

The word "optionally" means "with or without." For example, "optionally, a third helical element" means with or without a third helical element.

The acronym "ANSI" stands for American National Standards Institute, the name of an organization headquartered in Washington, D.C., USA. The acronym "ASTM" stands for ASTM International, the name of an organization headquartered in West Conshohocken, Pa., USA; ASTM International was previously known as the American Society for Testing and Materials. The acronym "ISO" stands for International Organization for Standardization, the name of an organization headquartered in Geneva 20, Switzerland. Preferably, the multicomponent composition or the ambient temperature curable composition is "substantially isocyanate-free", which means that the multicomponent composition or the ambient temperature curable composition contains less than 3 mol %, more preferably less than 1 mol %, and still more preferably less than 0.1 mol % of isocyanate groups, based on the total moles of carbamate groups plus isocyanate groups in the multicomponent composition or the ambient temperature curable composition.

The multicomponent compositions, ambient temperature curable compositions, or both of the present invention independently may further comprise one or more additional ingredients. Examples of the additional ingredients are an organic solvent, in the amount of 0.1 weight percent (wt. %) to ≤90 wt. %, based on the total weight of solids in the composition; a dehydrating agent, such as, for example, carboxylic anhydrides, carboxylic acid halides (e.g., acetyl chloride), and sulfonic acid halides (e.g., toluenesulfonyl chloride) in the amount of 0.01 wt % to ≤10 wt. %, based on the total weight of solids in the composition; as well as any of a surfactant, a dispersing agent, a wetting agent, an adhesion promoter, an ultraviolet (UV) light absorber, a light stabilizer, one or more colorants or dyes, and an antioxidant.

Examples of suitable organic solvents are non-polar or polar organic solvents such as, for example, an alkane (e.g., a $(C_6-C_{12})$alkane), ether (e.g., $(C_2-C_{12})$ether, e.g., a $(C_2-C_{12})$ dialkyl ether), carboxylic ester (e.g., a $(C_2-C_{12})$carboxylic ester), ketone (e.g., a $(C_3-C_{12})$ketone), secondary or tertiary carboxamide (e.g., a secondary or tertiary $(C_3-C_{12})$carboxamide), sulfoxide (e.g., a $(C_2-C_{12})$sulfoxide), or a mixture of two or more thereof.

Preferably, to reduce or eliminate the correlation between pot life of a composition and coating drying time or coating hardness, or both upon curing thereof, the multicomponent compositions of the present invention comprise a curing inhibitor such as, for example, =water or a primary alkanol (e.g., $(C_1-C_{12})$alkanols). The curing inhibitor may be used to delay onset of or increasing length of time of curing or both of the compositions until such time that curing is desirable, and can be removed from the composition (e.g., by evaporation), thereby initiating or increasing rate of curing thereof. Suitable curing inhibitors have a boiling point at atmospheric pressure of at most 300° C., more preferably at most 250° C., and, still more preferably at most 200° C. Preferably, when the curing inhibitor is present in the multicomponent compositions, it is present in an amount of from 0.5 wt. % to 90 wt. % based on the total weight of solids in the composition, or, more preferably, at most 60 wt. %, and, still more preferably, at most 50 wt. %. Preferably, the curing inhibitor concentration is at least 1 wt. %, based on the total weight of solids in the composition, and, still more preferably, at least 2 wt. %. The curing inhibitor can enable the composition to maintain, if desired, a long pot life (e.g., 14 days or longer), and then, when curing is desired, can be removed (e.g., by evaporation) from the invention composition so as to enable the curing and drying to touch of the resulting invention composition in a comparable amount of time as curing and drying to touch time of a same invention composition except lacking the curing inhibitor and enabling the resulting cured and dried coating thereof to exhibit a comparable degree of hardness as a cured and dried coating prepared from the same invention composition except lacking the curing inhibitor. Curing inhibitors may include, for example, alkanols, water, or mixtures thereof, or, more preferably, primary alkanols. Preferably, the alkanol is present at a concentration of from 0.5 wt % to 50 wt %, based on the total weight of solids in the composition, or more preferably, at most 20 wt %, and, still more preferably, at most 10 wt %. More preferably, the alkanol concentration is at least 1 wt %, based on the total weight of solids in the composition, and still more preferably at least 2 wt %. Preferably, water is present at a concentration of from 0.5 wt % to 40 wt %, based on the total weight of solids in the composition, or more preferably, at most 20 wt %, and, still more preferably, at most 10 wt %. More preferably, the water concentration is at least 1 wt %, based on the total weight of solids in the composition, and still more preferably at least 2 wt %. More preferably, the curing inhibitor comprises a combination of the water and the alkanol.

Preferably, to increase the flexibility (e.g., Mandrel Bend), adhesion, or both of a cured and dried coating or film or composition prepared from the multicomponent compositions of the present invention, the composition comprise a pigment (e.g., $TiO_2$, lamp black, talc, calcium carbonate, or clay). Preferably, the effective amount of pigment for increasing adhesion is from 1 wt. % to 25 wt %, based on the total weight of solids in the composition, preferably, 3 wt. % or more, e.g., from 3 wt % to 20 wt %, or, more preferably, 5 wt. % or more, or up to 15 wt. %, or up to 8 wt. %. Flexibility (Mandrel Bend) is determined according to ASTM D522-93a (2008; *Standard Test Methods for Mandrel Bend Test of Attached Organic Coatings*). Adhesion is determined according to ASTM D3359-09 (Standard Test Methods for Measuring Adhesion by Tape Test; see ASTM D3359-09e2, 2009).

The multicomponent compositions of the present invention may lack organic solvent, or they may lack the dehydrating agent, or they may lack the dispersion medium, or they may lack the surfactant, or they may lack the dispersing agent, or they may lack the wetting agent, or they may lack the adhesion promoter, or they may lack the UV light absorber, or they may lack the light stabilizer, or they may lack the colorant or dye, or they may lack the antioxidant.

Preferably, the multicomponent compositions of the present invention form geminal bis(urethane) groups when the first component and second component are combined and reacted.

For example, the polyaldehyde of the second component of the present invention may have two aldehyde groups (also referred to herein as a dialdehyde), wherein at least one of the two aldehyde groups reacts with two carbamate groups from the same polyurethane chain (molecule) so as to form the crosslinked polyurethane comprising a plurality of geminal bis(urethane) groups. The two aldehyde groups of the dialdehyde may react with two carbamate groups from two different polyurethane chains so as to form the crosslinked polyurethane comprising a plurality of geminal bis(urethane) groups. Suitable polyaldehydes of the present invention have two, three, four or more aldehyde groups. A polyaldehyde having three aldehyde groups is also referred to herein as a trialdehyde.

The polyaldehyde of the second component can include any such molecule having from 2 to 20 carbon atoms or it can have more than 20 carbon atoms, i.e, up to 100, with the proviso that polyaldehydes having more than 20 carbon atoms will have at least one aldehyde group for every 11 carbon atoms, for example, at least one aldehyde group for every 10 carbon atoms. The polyaldehyde can be a cyclic, straight or branched; cyclic and nonaromatic; cyclic and aromatic (e.g., 3-formylbenzaldehyde), or a combination thereof.

The polyaldehyde of the present invention is substantially formaldehyde free. As used herein, the term "substantially formaldehyde free" means that the multicomponent composition or ambient temperature curable composition comprises less than 500 ppm of free formaldehyde, based on the total weight of polyaldehyde solids, preferably, less than 300 ppm, or, more preferably, less than 200 ppm. The compositions of the present invention contain so little of resins made from formaldehyde, such as aminoplasts and phenol or resole formaldehyde condensates, that the amount of free formaldehyde in such compositions meets the definition of "substantially formaldehyde free".

Preferably, the polyaldehyde of the present invention comprises one or more cyclic, nonaromatic polyaldehydes or one or more aromatic polyaldehydes. For example, the polyaldehyde comprises one or more cyclic, nonaromatic polyaldehydes having from 3 to 20 ring carbon atoms, and may consist essentially of one or more cyclic, nonaromatic polyaldehydes having from 3 to 20 ring carbon atoms.

More preferably, each cyclic, nonaromatic polyaldehyde in the multicomponent composition independently has from 5 to 12 ring carbon atoms, and, even more preferably, is a mixture of (cis,trans)-1,4-cyclohexanedicarboxyaldehydes and (cis, trans)-1,3-cyclohexanedicarboxyaldehydes.

According to the present invention, the polyaldehyde may comprise one or more acyclic, straight or branched polyaldehyde having from 2 to 16 carbon atoms.

In another embodiment, each of the one or more acyclic, straight or branched polyaldehydes having 16 carbon atoms or more is prepared by hydroformylating a substantially water insoluble multi-olefin-containing compound that is derived from a fatty acid ester or, more preferably, a seed oil. For example, each of the one or more acyclic, straight or branched polyaldehydes having 16 carbon atoms or more is prepared by hydroformylating a multi-olefin-containing oligomer or polymer. Preferably, the multi-olefin-containing compound that is derived from the seed oil is a multi-olefin-containing fatty acid triglyceride having 48 carbon atoms or more.

Examples of suitable cyclic polyaldehydes are trans-1,3-cyclohexanedicarboxaldehyde; cis-1,3-cyclohexanedicarboxaldehyde; trans-1,4-cyclohexanedicarboxaldehyde; cis-1,4-cyclohexanedicarboxaldehyde; a mixture of 1,3-cyclohexanedicarboxaldehydes and 1,4-cyclohexanedicarboxaldehydes, preferably a 1-to-1 mixture thereof; exo,exo-2,5-norbornanedicarboxaldehyde; exo,exo-2,6-norbornanedicarboxaldehyde; exo,endo-2,5-norbornanedicarboxaldehyde; exo,endo-2,6-norbornanedicarboxaldehyde; endo,endo-2,5-norbornanedicarboxaldehyde; endo,endo-2,6-norbornanedicarboxaldehyde product (endo and exo mixture); 3-(3-formylcyclohexyl)propanal; 3-(4-formylcyclohexyl)propanal; 2-(3-formylcyclohexyl)propanal; 2-(4-formylcyclohexyl)propanal; and cyclododecane-1,4,8-tricarbaldehyde. The trans-1,3-cyclohexanedicarboxaldehyde; cis-1,3-cyclohexanedicarboxaldehyde; trans-1,4-cyclohexanedicarboxaldehyde; and cis-1,4-cyclohexanedicarboxaldehyde can be prepared by a process comprising hydroformylating 3-cyclohexene-1-carboxaldehyde using the hydroformylating conditions described later. The 1:1 mixture of 1,3- and 1,4-cyclohexanedicarboxaldehydes can be prepared by a process comprising reacting acrolein and 1,3-butadiene in a Diels-Alder reaction to give 3-cyclohexenecarboxaldehyde (also called 1,2,3,6-tetrahydrobenzaldehyde), and hydroformylating the 3-cyclohexenecarboxaldehyde using the hydroformylating conditions described later. The exo,exo-2,5-norbornanedicarboxaldehyde; exo,exo-2,6-norbornanedicarboxaldehyde; exo,endo-2,5-norbornanedicarboxaldehyde; exo,endo-2,6-norbornanedicarboxaldehyde; endo,endo-2,5-norbornanedicarboxaldehyde; and endo,endo-2,6-norbornanedicarboxaldehyde product (endo and exo mixture) can be prepared by a process comprising reacting acrolein and cyclopentadiene in a Diels-Alder reaction to give a 2-norbornene-5-carboxaldehyde, and hydroformylating the 2-norbornene-5-carboxaldehyde using the hydroformylating conditions described later. The 3-(3-formylcyclohexyl)propanal; 3-(4-formylcyclohexyl)propanal; 2-(3-formylcyclohexyl)propanal; and 2-(4-formylcyclohexyl)propanal can be prepared by a process comprising hydroformylating vinyl cyclohexene. The cyclododecane-1,4,8-tricarbaldehyde can be prepared by a process comprising trimerizing 1,3-butadiene to give 1,4,8-cyclododecatriene, and hydroformylating the 1,4,8-cyclododecatriene using the hydroformylating conditions described later.

The polyaldehyde of the present invention can be unblocked and unprotected or blocked or protected. Blocked or protected polyaldehydes can be formed by reacting an unblocked and unprotected polyaldehyde with a suitable blocking or protecting group. Examples of protecting or blocking groups for aldehyde groups are bisulfites (e.g., from reaction of the polyaldehyde with sodium bisulfite), dioxolanes (e.g., from reaction of the polyaldehyde with ethylene glycol), oximes (e.g., from reaction of the polyaldehyde with hydroxylamine), imines (e.g., from reaction of the polyaldehyde with methylamine), and oxazolidines (e.g., from reaction of the polyaldehyde with a 2-aminoethanol).

Preferred aldehyde protecting groups are, and preferred protected polyaldehydes comprise, a hydrated group ($>C(OH)_2$), hemiacetal, acetal, or imine. These preferred protected polyaldehydes can be prepared by respectively reacting the polyaldehyde with water; one mole equivalent of an alkanol (e.g., methanol or ethanol); two mole equivalents of the alkanol; or ammonia or a primary amine (e.g., methylamine). The hemiacetal, acetal, or imine protecting group can, if desired, be removed by a deprotection such as hydrolysis to give back the unprotected form of the polyaldehyde. Such aldehyde protecting or blocking groups and formation and removal (i.e., deprotection) is taught, for example, in U.S. Pat. No. 6,177,514 B1.

Preferably, the polyaldehyde is stable in neat form (i.e., does not materially self-polymerize) and, more preferably, is substantially water insoluble and is stable in neat form.

The polyaldehydes of the present invention can be prepared by any suitable means, including oxidation of corresponding polyols, and via batchwise and continuous processes for preparing the polyaldehydes. Preferably the polyaldehyde is prepared by hydroformylating a substantially water-insoluble mono-olefin containing aldehyde compound, substantially water-insoluble multi-olefin containing aldehyde compound, or a substantially water-insoluble multi-olefin containing starting compound (collectively referred to herein for convenience as substantially water-insoluble olefin-containing compounds). The hydroformylation step can be performed by any conventional means such as with hydrogen gas, carbon monoxide, and the olefin-containing starting compound. Preferably the hydroformylating step is performed in a manner as generally described in U.S. Pat. No. 6,252,121 B1, which describes an improved separation process.

In a suitable hydroformylation process, for example, total gas pressure of hydrogen gas ($H_2$), carbon monoxide (CO) and olefin starting compound can range from about 1 pound per square inch absolute (psia; 6.9 kilopascals (kPa)) to about 10,000 psia (69 megapascals (MPa)). In general, however, it is preferred that the process be operated at a total gas pressure of hydrogen, carbon monoxide and substantially water-insoluble olefin-containing compound of less than about 2000 psia and more preferably less than about 1000 psia. The minimum total pressure is limited predominately by the amount of reactants necessary to obtain a desired rate of reaction. More specifically the carbon monoxide partial pressure of the hydroformylation process of this invention is preferable from about 1 psia to about 1000 psia, and more preferably from about 3 psia to about 800 psia, while the hydrogen partial pressure is preferably about 5 psia to about 500 psia and more preferably from about 10 psia to about 300 psia. In general $H_2$:CO molar ratio of gaseous hydrogen to carbon monoxide can range from about 1:10 to 100:1 or higher, the more preferred hydrogen to carbon monoxide molar ratio being from about 1:10 to about 10:1. Further, the hydroformylation process can be conducted at a reaction temperature from about −25° C. to about 200° C. In general hydroformylation reaction temperatures of about 50° C. to about 120° C. are preferred for all types of olefinic-containing compounds.

Preferably, hydroformylation is carried out in a continuous manner. Continuous hydroformylation processes are well known in the art and can involve: (a) hydroformylating the olefinic-containing compound(s) with carbon monoxide and hydrogen gas in a liquid homogeneous reaction mixture comprising a non-polar solvent, the metal-organophosphorus ligand complex catalyst, and free organophosphorus ligand; (b) maintaining reaction temperature and pressure conditions favorable to the hydroformylation of the olefinic-containing compound(s); (c) supplying make-up quantities of the olefinic-containing compound(s), carbon monoxide and hydrogen gas to the reaction medium as those reactants are used up; and (d) recovering the desired polyaldehyde product(s) by phase separation.

When non-optically active polyaldehyde products are desired, achiral substantially water-insoluble olefin-containing compound starting materials and organophosphorus ligands are employed. When optically active polyaldehyde products are desired prochiral or chiral type substantially water-insoluble olefin-containing compound starting materials and organophosphorus ligands are employed.

The present invention also is directed to preparation and use of polyaldehydes prepared by a process that comprises: (1) reacting the olefinic-containing compound with carbon monoxide and hydrogen gas in the presence of a metal-organophosphorus ligand complex catalyst, optionally free organophosphorus ligand, and a non-polar solvent to form a multiphase reaction product fluid; and (2) separating said multiphase reaction product fluid to obtain a non-polar phase and polar phase, the non-polar phase comprising said olefinic-containing compound, metal-organophosphorus ligand complex catalyst, optionally free organophosphorus ligand and non-polar solvent and the polar phase comprising the polyaldehydes.

Preparations of the polyaldehyde can optionally further comprise reversibly blocking or protecting aldehyde groups of the polyaldehydes with aldehyde blocking or protecting groups to give a blocked or protected polyaldehyde, respectively. The protected polyaldehyde can be employed in place of or in addition to the polyaldehyde in the invention multi-component composition. In such embodiments, the invention process of preparing the invention crosslinked polyurethane can employ the protected polyaldehyde in place of or in addition to the polyaldehyde and the process can comprise curing the polycarbamate directly with the protected polyaldehyde or the process can optionally further comprise a step of deprotecting the protected polyaldehyde so as to obtain the polyaldehyde in situ, and curing the same with the polycarbamate first component, as described herein.

Preferably, the polyaldehydes of the present invention are mixtures comprising two or more of trans-1,3-cyclohexanedicarboxaldehyde, cis-1,3-cyclohexanedicarboxaldehyde, trans-1,4-cyclohexanedicarboxaldehyde and cis-1,4-cyclohexanedicarboxaldehyde, or protected or blocked forms of these polyaldehydes.

The polyaldehyde product mixtures can be separated from the other components of crude reaction mixtures in which the polyaldehyde mixtures are produced by phase separation. Phase separation can occur spontaneously or can be induced by a change in temperature or pressure or the addition of an additive, e.g., salt, solvent or combinations thereof. For example, at the conclusion of (or during) hydroformylation, the desired polyaldehyde can be recovered from the reaction mixtures. For instance, in a continuous liquid catalyst recycle process the portion of a liquid reaction mixture (containing polyaldehyde product, catalyst, etc.) removed from the reaction zone can be passed to a separation zone wherein the desired polyaldehyde product can be separated via phase separation from the liquid reaction mixture, and further purified if desired. The remaining catalyst containing liquid reaction mixture can then be recycled back to the reaction zone and if desired any other materials, e.g., unreacted substantially water-insoluble olefin-containing compound, together with any hydrogen gas and carbon monoxide dissolved in the liquid reaction after separation thereof from the polyaldehyde product.

The polycarbamate of the first component of the present invention may have an average of 2.5 or more carbamate groups, or an average of three or more carbamate groups, or an average of four or more carbamate groups. As used herein, the term "average number of carbamate groups" assumes full conversion of the polyol or (poly)isocyanate used to form the polycarbamate and means the total number average molecular weight of the polycarbamate as determined by gel permeation chromatography divided by the number of hydroxyl groups in the polyol used to make the carbamate or the number of isocyanate groups in the (poly)isocyanate used to make the carbamate, whichever is used. In the case of an alkyd, the number of hydroxyl groups equals the number average molecular weight of the alkyd as determined by GPC divided by the hydroxyl equivalent weight of the alkyd, i.e. 56,100 mg KOH/mole KOH divided by the hydroxyl number in mg KOH/g resin. Further, the number average molecular weight of the polycarbamate can be determined by GPC of the polyol or polyisocyanate followed by including in the added weight from reaction with urea or alkyl carbamate to make the polycarbamate.

The polycarbamate can be acyclic, straight or branched; cyclic and nonaromatic; cyclic and aromatic, or a combination thereof. In some embodiments the polycarbamate comprises one or more acyclic, straight or branched polycarbamates. For example, the polycarbamate may consist essentially of one or more acyclic, straight or branched polycarbamates.

Preferably the polycarbamate consists essentially of, and more preferably consists of carbon, hydrogen, nitrogen, and oxygen atoms. Still more preferably the polycarbamate consists of carbon, hydrogen, nitrogen, and oxygen atoms, wherein each nitrogen and oxygen atom is the nitrogen or oxygen atom of one of the two or more carbamate groups of the polycarbamate.

Typically the polycarbamate is prepared by (a) reacting a polyol with O-methyl carbamate or urea to give the polycarbamate; (b) reacting a polyisocyanate with an O-hydroxy($C_2$-$C_{20}$)alkyl-carbamate to give the polycarbamate; or (c) reacting the O-hydroxy($C_2$-$C_{20}$) alkyl-carbamate with methacrylic anhydride to give a 2-carbamoylalkyl methacrylate, and then polymerizing the 2-carbamoylalkyl methacrylate with an acrylic acid monomer to give the polycarbamate as a polyacrylic-based polycarbamate. The polycarbamates produced in (a) to (c) typically will have different structures. Examples of these reactions are illustrated graphically below in respective Schemes (a) to (c):

Scheme (a):

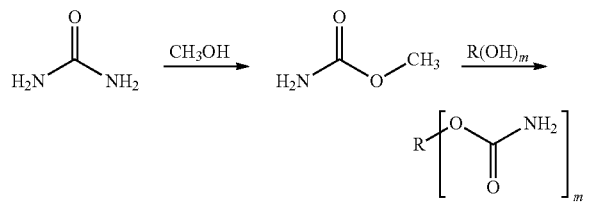

wherein $m$ is as defined for Scheme (a) and R(OH)$_m$, where $m$ is 2 or greater . . .

Scheme (b):

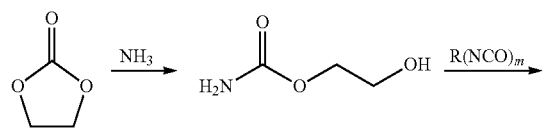

-continued

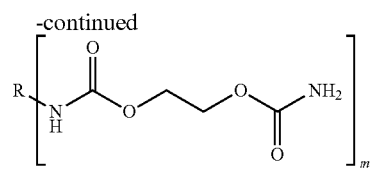

wherein $m$ is an integer of from 2 or greater. Preferably $m$ is an integer of from 2 to 20. In some embodiments $m$ is 2 or 3.

Scheme (c):

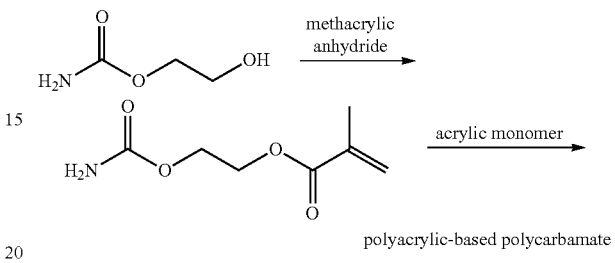

wherein methacrylic anhydride is [$CH_2$=$C(CH_3)$C(=O)]$_2$O and examples of acrylic monomers are acrylic acid, ($C_1$-$C_{20}$)alkylacrylic acid (e.g., the ($C_1$)alkylacrylic acid is methacrylic acid), and ($C_1$-$C_{20}$)alkyl acrylate (i.e., acrylic acid ($C_1$-$C_{20}$)alkyl ester, e.g., ($C_1$)alkyl acrylate means methyl acrylate). Not shown in Scheme (c), other olefinic monomers (e.g., styrene) can also be employed along with the acrylic monomer, thereby preparing the polycarbamate as a poly(acrylic other olefinic monomer)-based polycarbamate.

Preferably, each of the one or more acyclic, straight or branched polycarbamates is prepared by reacting one or more polyols with an unsubstituted carbamic acid alkyl ester or urea to yield the one or more acyclic, straight or branched polycarbamates. Suitable polyols may be (meth)acrylic polyols (i.e., a methacrylic or acrylic polyol), polyalkylene polyols, polyether polyols (e.g., a poly(oxyalkylene) such as a poly(oxyethylene), such as a poly(ethylene glycol), polyester polyols, or polycarbonate polyols. Preferably, the polyalkylene polyol is a polyalkylene glycol. Preferably the polyalkylene glycol is a polyethylene glycol or polypropylene glycol.

More preferably, the polycarbamate comprises one or more cyclic, nonaromatic polycarbamates and may consist essentially of one or more cyclic, nonaromatic polycarbamates.

In some embodiments each of the one or more cyclic, nonaromatic polycarbamates is a N,N',N"-trisubstituted-cyanuric acid derivative, wherein each substituent thereof independently is of formula: $H_2NC(=O)O—(CH_2)_n—OC(=O)$ NH—$CH_2$—(($C_3$-$C_{12}$)cycloalkyl)$CH_2$—, wherein n is an integer of from 2 to 20. Preferably each n independently is an integer of from 2 to 12 and each cyclohexylene independently is a 1,3-cyclohexylene or 1,4-cyclohexylene. More preferably, n is 2 and the N,N',N"-trisubstituted-cyanuric acid is the compound (P3) used in Example 3.

Preferably, the polycarbamate of the present invention is substantially isocyanate free. Presence or absence of molecules containing isocyanate groups can be readily determined by Fourier Transform Infrared (FT-IR) spectroscopy or carbon-13 nuclear magnetic resonance ($^{13}$C-NMR) spectroscopy. Where an isocyanate group-containing reactant is employed, the polycarbamate prepared therefrom is titrated or "quenched" by an isocyanate quenching agent to convert any residual isocyanate groups to carbamates or amines Examples of compounds that could be used as an isocyanate quenching agent are water, sodium hydroxide, methanol, sodium methoxide, and a polyol.

According to the present invention, the multicomponent compositions may consist essentially of the polyaldehyde second component and the polycarbamate first component having in one of the components, or separately a triggering agent. According to the present invention, the ambient temperature curable compositions may consist essentially of a mixture of the first component, the second component and the triggering agent. Such multicomponent compositions and ambient temperature curable compositions are substantially formaldehyde free and substantially isocyanate free. Preferably, the multicomponent compositions are substantially isocyanate-free, such as, for example, a 2-part formulation comprising in a first component the polycarbamate and the effective amount of a triggering agent and in the second component the polyaldehyde; wherein the first and second parts are cooperatively disposed for being mixed together so as to form the ambient temperature curable composition.

Preferably in the present invention, the curing temperature of the ambient temperature curable composition is 80° C. or lower, more preferably 60° C. or lower, still more preferably 40° C. or lower, and even more preferably 30° C. or lower. A preferred minimum effective curing temperature is a minimum temperature effective for curing the invention ambient temperature curable composition to yield the invention crosslinked polyurethane within 7 days. The curing step of the invention process employing the invention ambient temperature curable composition remarkably can be performed at ambient temperature (i.e., 60° C. or lower). In some embodiments the ambient temperature for curing is at least 0° C., in some embodiments at least 10° C., and in some embodiments at least 20° C. In some embodiments the ambient temperature for curing is 50° C. or less, in some embodiments 40° C. or less, in some embodiments 35° C. or less, and in some embodiments 30° C. or less. A preferred ambient temperature for curing is from 19° C. to 29° C.

Despite curing the invention ambient temperature curable composition at ambient temperature, the invention process prepares the invention crosslinked polyurethane within a curing time period of 7 days or shorter. In some embodiments the ambient temperature curable composition is cured for a curing time period of 5 days or shorter, more preferably 24 hours or shorter, still more preferably 12 hours or shorter, even more preferably 1 hour or shorter. Such short curing time periods are remarkable for an ambient temperature curing step.

Preferably a crosslinked polyurethane prepared according to the present invention forms a coating that exhibits good to excellent cross-hatch adhesion, water resistance, resistance to rubbing with methyl ethyl ketone, high pendulum hardness, or a combination of any two or more thereof.

Preferably, the curing step of the invention process does not generate a reaction byproduct that is a volatile organic compound (VOC). Preferably, the methods of the present invention further comprise drying the cross-linked polyurethane so as to remove at least 80 weight percent (wt %), preferably at least 90 wt %, and more preferably 95 wt % of the water byproduct, thereby preparing a dried crosslinked polyurethane.

Preferably, the crosslinked polyurethane of the present invention is, a water resistant crosslinked polyurethane. Still further, the crosslinked polyurethane may be resistant to deterioration by an organic solvent (e.g., methyl ethyl ketone (MEK)).

The invention curing step preferably is initiated by a triggering event, triggering agent, or a combination thereof. Such initiation is performed by beginning exposure of the invention multicomponent composition to the triggering event, triggering agent, or combination thereof; and continuing such exposure for a period of time sufficient to produce the invention crosslinked polyurethane. An example of the triggering event is heat. Preferably heat is applied radiantly although other means such as by convection or combinations of means can be used. Preferably, the triggering agent is used in an amount of from 0.001 wt % to 10 wt % of the multicomponent composition, based on the total weight of solids in the composition, more preferably from 0.01 wt % to 5 wt % thereof, or, preferably from 0.1 wt % to 2 wt % thereof. Such amounts of the triggering agent are referred to herein as "effective amounts" of the triggering agent.

Any compound, substance or material suitable for increasing a rate of reaction of a carbamate group (—O—C(═O)—NH$_2$) with an aldehyde group (—C(═O)H) can be employed as the triggering agent. Examples of triggering agents are Lewis acids (e.g., boron trifluoride etherate) and protic acids (i.e., Brønsted acids). Preferably, the triggering agent comprises a protic acid characterizable as having a pK$_a$ of 6 or lower, wherein pK$_a$ is negative base-10 logarithm of acid dissociation constant, K$_a$, of the protic acid. Thus, the ambient temperature curable composition of the present invention has a pH of 7.0, or less, preferably, from pH 3 to pH<6. A preferred protic acid is an inorganic protic acid or organic protic acid. A preferred inorganic protic acid is phosphoric acid or sulfuric acid. A preferred organic protic acid is carboxylic acid, phosphonic acid, or sulfonic acid. A preferred carboxylic acid is acetic acid, trifluoroacetic acid, propionic acid, or a dicarboxylic acid. A preferred phosphonic acid is methylphosphonic acid. A preferred sulfonic acid is methanesulfonic acid, benzenesulfonic acid, a camphorsulfonic acid; para-toluenesulfonic acid, or dodecylbenzenesulfonic acid. Examples of suitable Lewis acid curing catalysts are AlCl$_3$; benzyltriethylammonium chloride (TEBAC); Cu(O$_3$SCF$_3$)$_2$; (CH$_3$)$_2$BrS$^+$Br$^-$; FeCl$_3$ (e.g., FeCl$_3$.6H$_2$O); HBF$_4$; BF$_3$.O(CH$_2$CH$_3$)$_2$; TiCl$_4$; SnCl$_4$; CrCl$_2$; NiCl$_2$; and Pd(OC(O)CH$_3$)$_2$.

The triggering agent can be unsupported (no solid support) or supported, i.e. covalently bonded to a solid support. Examples of supported triggering agents are supported curing catalysts such as supported acid catalysts such as acid (H$^+$) forms of cation exchange-type polymer resins (e.g., ethanesulfonic acid, 2-[1-[difluoro[(1,2,2-trifluoroethenyl)oxy]methyl]-1,2,2,2-tetrafluoroe thoxy]-1,1,2,2-tetrafluoro-, polymer with 1,1,2,2-tetrafluoroethene sold under trade name NAFION NR50 (E. I. du Pont de Nemours & Co., Inc., Wilmington, Del.) and ethenylbenzenesulfonic acid polymer with diethenylbenzene sold as AMBERLYST™ 15 (Rohm and Haas Co., subsidiary of The Dow Chemical Company, Midland, Mich., USA.).

To form the ambient temperature curable composition of the present invention, a polyaldehyde second component, an effective amount of a triggering agent and a polycarbamate first component are mixed together.

The crosslinked polyurethane of the present invention comprises a plurality of the connecting carbamate diradicals. The term "connecting carbamate diradical" refers to a molecule formed by reaction of an aldehyde group of, or from the polyaldehyde and a carbamate group of, or from the polycarbamate. The connecting carbamate diradical comprises a hemi-aminal group or a geminal bis(urethane) group. The hemi-aminal group comprises a diradical structure of formula (H-A):

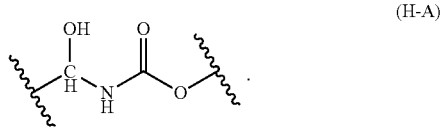 [SMILES: *OC(=O)NC(*)O]

(H-A)

The hemi-aminal group is formed from a reaction of one carbamate group of the polycarbamate with one aldehyde group of the polyaldehyde. The geminal bis(urethane) group comprises a moiety of the formula (G-BU):

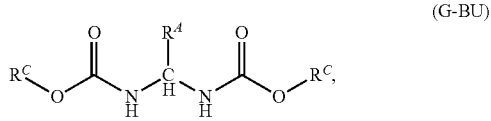

(G-BU)

wherein $R^A$ is a residual of the polyaldehyde (e.g., dialdehyde) and $R^C$ is a residual of the polycarbamate (e.g., dicarbamate). The geminal bis(urethane) group is formed from a reaction of two carbamate groups with one aldehyde group of the polyaldehyde. Formation of the geminal bis(urethane) group from the reaction of the polyaldehyde and polycarbamate occurs at acidic pH, i.e., where pH of the invention ambient temperature curable composition is pH≤7.0, e.g., from pH 3 to pH<6; and that such formation of the geminal bis(urethane) group cannot occur at basic pH, i.e., where pH of the invention ambient temperature curable composition is pH>7.0, e.g., from pH 7.1 to pH 14). Typically one of the two carbamate groups is from one polycarbamate molecule and the other of the two carbamate groups is from another polycarbamate molecule (i.e., each $R^C$ in formula (G-BU) is from a different polycarbamate molecule). The type of connecting carbamate diradicals in the invention crosslinked polyurethane can be readily identified by analytical techniques such as, for example, one or more of the following techniques: elemental analysis, infrared (IR) spectroscopy (e.g., Fourier Transform IR spectroscopy or FT-IR spectroscopy), mass spectrometry, and nuclear magnetic resonance (NMR) spectroscopy (e.g., proton-NMR spectroscopy such as by observing and integrating the proton on each of the carbon atoms bearing the —OH in formula (H-A) and the proton on each of the carbon atoms bearing $R^A$ in formula (G-BU)).

Preferably, the crosslinked polyurethane comprises at least one geminal bis(urethane) group. More preferably, the crosslinked polyurethane comprises a plurality of geminal bis(urethane) groups.

Remarkably, the crosslinked polyurethane can be prepared even when the polyaldehyde has only two aldehyde groups and the polycarbamate has only two or more carbamate groups. This is because at least one aldehyde group of the polyaldehyde is capable of reacting with two carbamate groups, one from each of two different adjacent polycarbamates, thereby crosslinking the adjacent polycarbamates via the polyaldehyde so as to form one of the aforementioned plurality of geminal bis(urethane) groups. Such a double reaction produces a molecule of water as a byproduct.

The geminal bis(urethane) group allows even the dialdehyde to react and crosslink the polycarbamate and thereby form the invention crosslinked polyurethane having dialdehyde-derived crosslinks. The geminal bis(urethane) group can also be formed with the polyaldehyde having three or more aldehyde groups, which polyaldehyde having three or more aldehyde groups thereby crosslinks the polycarbamate so as to form the invention crosslinked polyurethane having such polyaldehyde-derived crosslinks.

The crosslinked polyurethanes of the present invention, even those produced by curing at room temperature, have a high degree of crosslinking. This high degree of crosslinking preferably is evidenced by their spectral property (e.g., obtained from proton-nuclear magnetic resonance ($^1$H-NMR) spectroscopy, $^{13}$C-NMR spectroscopy, or FT-IR spectroscopy) or, more preferably, by one or more improved performance properties compared to prior art, especially melamine-formaldehyde prior art. Preferably at least one of the improved performance properties is cross-hatch adhesion, water resistance, deterioration resistance to methyl ethyl ketone rubs, or high pendulum hardness.

Preferably, methods of using the crosslinked polyurethanes of the present invention comprise coatings formed with the multicomponent compositions, wherein the coating exhibits a water resistance, resistance to rubbing with methyl ethyl ketone, high pendulum hardness, cross-hatch adhesion, or a combination of any two or more thereof.

An adhesive composition of the present invention may comprise the invention crosslinked polyurethane, which is disposed between and in independent operative contact with at least a portion of each of two substrates capable of being adhered to each other.

The coating composition of the present invention comprises a layer of the invention crosslinked polyurethane, which is in coating operative contact to at least a portion of a substrate capable of being coated.

The invention coated substrate can be prepared by any suitable method. For example, in a method of coating a surface of a substrate, the method comprises applying invention ambient temperature curable composition to at least a portion of the surface of the substrate and curing the curable coating of the ambient temperature curable composition of the composite material at a curing temperature of 80° C. or less, or, for example, 30° C. or less, so as to prepare a coated substrate comprising a crosslinked polyurethane.

Preferably, the invention coating exhibits a pendulum hardness in seconds of 30 or greater, more preferably, 50 or greater, still more preferably, 80 or greater, and even more preferably, 100 or greater.

Preferably, the coatings of the present invention exhibit resistance to organic solvent, i.e., methyl ethyl ketone (MEK) back-and-forth double rubbing (i.e., one rub back, one rub forth equals one double rub) of 30 or greater, more preferably, 50 or greater, still more preferably, 70 or greater, even more preferably, 100 or greater, and yet more preferably, greater than 200 (>200). Such organic solvent resistance is evidence of crosslinking to form a crosslinked polyurethane.

Preferably, the invention coating exhibits water resistance of from 2 to 6, more preferably from 3 to 6, still more preferably from 4 to 6, even more preferably from 5 to 6, and yet more preferably 6. These values are described later.

Preferably, the invention coating exhibits a cross-hatch adhesion value of from 1 B to 5 B, more preferably from 2 B to 5 B, still more preferably from 3 B to 5 B, even more preferably from 4 B to 5 B, and yet more preferably 5 B.

In determining any one or more of the aforementioned pendulum hardness, number of MEK double rubs (back-and-forth), and cross-hatch adhesion values, the coating is formed on a steel substrate as described herein. In determining water resistance values, the coating is formed on a steel or poplar wood substrate as described herein. Preferably the invention coating so formed has a thickness, as measured as described later, of from 10 micrometers (μm) to 70 μm, more preferably 50 μm or less, still more preferably less than 40 and even more preferably less than 30 μm. In some embodiments the invention coating so formed has a thickness of 14 μm or greater, and still more preferably 20 μm or greater.

The crosslinked polyurethane of the present invention may comprise a sealant, which is disposed in sealing operative contact to a substrate capable of being sealed. Preferably the invention sealant prevents or inhibits passage of a liquid or gas, dust or smoke; more preferably a liquid or gas; still more preferably a liquid, and even more preferably water. In some embodiments the sealant further comprises an inert filler material (e.g., inert finely-divided powder). In methods of using the sealants of the present invention, sealed substrates can be prepared by any suitable method. For example, a method of sealing a substrate comprises contacting the invention ambient temperature curable composition to at least a portion of the substrate to yield a composite material comprising a curable coating of the ambient temperature curable composition in operative contact with at least the portion of the substrate; and curing the curable coating of the ambient temperature curable composition of the composite material at a curing temperature of from 0° C. to less than 80° C. so as to prepare a sealed substrate comprising a sealant layer of the invention crosslinked polyurethane in sealing operative contact to at least the portion of the substrate. For example, the curable composition may be cured at a curing temperature of 30° C. or less.

The invention ambient temperature curable composition can be applied to the surface of the substrate(s) by any suitable applying means such as, for example, brushing, calendaring, rolling, spraying, mopping, troweling, or dipping. The substrate being coated, adhered to, or sealed can be of any shape including, for example, a flat or rolled sheet (e.g., cylinder), sphere, beads, finely divided particles, and the like. The surface of the substrate being coated, adhered to, or sealed can be irregular or regular, continuous or discontinuous, porous or non-porous, jointed or not jointed.

The substrates suitable for being adhered to, coated, or sealed independently can comprise any material. Examples of suitable material are wood, metal, ceramic, plastic, and glass.

The adhesive article comprises adhered substrates, the adhered substrates comprising the invention crosslinked polyurethane disposed between and in adhering operative contact to at least portions of two substrates. The two substrates are the same or different.

The coated article comprises a coated substrate comprising a layer of the invention crosslinked polyurethane in coating operative contact to at least a portion of a substrate.

The sealed article comprises a sealed substrate comprising a layer of the invention crosslinked polyurethane in sealing operative contact to at least a portion of a substrate.

Preferably, the multicomponent compositions are provided in a kit. Preferably, the kit comprises a separate first component and second component, and for mixing them a tool or feature, such as a destructible barrier between the components; the kit may comprise a stabilized mixture of the invention multicomponent composition. The term "stabilized mixture" means a physical combination of ingredients that will not undergo a curing step, or undergoes such curing step extremely slowly (e.g., rate of less than 1 percent curing per week) when the combination of ingredients is at 24° C. or less, preferably 30° C. or less, and more preferably 40° C. or less. Such stabilized mixtures may comprise the curing inhibitor of the present invention.

Materials:

UNOXOL™ Diol is an approximate 1:1 mixture of (cis, trans)-1,3-cyclohexanedimethanol and (cis,trans)-1,4-cyclohexanedimethanol that is available from The Dow Chemical Company, Midland, Mich., USA.

Glutaraldehyde and glyoxal were purchased from Aldrich.

Dibutyltin dilaurate is purchased from the Aldrich Chemical Company, St. Louis, Mo., USA.

Dibutyltin oxide is purchased from the Aldrich Chemical Company.

Isophorone diisocyanate (IPDI) is purchased from Bayer Corporation.

Luperox™ tertiary-amyl 2-ethylhexyl peroxycarbonate (TAEC), a radical initiator, is purchased from Arkema. Inc., Philadelphia, Pa., USA.

Natural Oil Polyol (NOP) is prepared from methyl hydroxymethyl stearate (MHMS) monomers obtained from soy. See WO 2009/009271 A2.

Methyl carbamate ($CH_3C(=O)NH_2$) is obtained from the Aldrich Chemical Company.

Acrylic polyol Desmophen™ A365 having about 7.1 OH functional groups on average per molecule is obtained from Bayer Corporation.

Tone™ 0210 polyol is a polycaprolactone diol having a hydroxyl number of 135.2 milligrams of potassium hydroxide (KOH) per gram thereof (mg KOH/g).

PARALOID™ AU-608X acrylic polyol has 58 wt % solids in xylene, a hydroxyl equivalent weight of 695 g/equivalent mole (solids) and about 11.5 OH functional groups on average per molecule.

Tone 0210 polyol and PARALOID AU-608X polyol are obtained from The Dow Chemical Company, Midland, Mich., USA.

DURAMAC™ 52-5205 short oil alkyd resin based on coconut oil having a hydroxyl number (60 wt % solids in xylene) of 175, acid number Maximum (solids) of 8 is obtained from Momentive Specialty Chemicals, Carpentersville, Ill., USA.

Cymel™ 303 Hexamethylolmelamine from Cytec, Stamford, Conn. Steel plates are Act Test Panels, Cold Roll Steel, smooth and clean, having dimensions of 4 inches by 12 inches by 0.02 inch (10 centimeters (cm) by 30 cm by 0.05 cm)

Poplar wood boards are Home Depot poplar, having dimensions 3.5 inches by 5 inches (8.9 cm by 13 cm), cut from 3.5 inches by 3 feet (8.9 cm by 91 cm) boards.

Methods:

Percent Solids: Determined by following ASTM D2369-07 (Standard Test Method for Volatile Content of Coatings (2007)) except as follows. Determinations are done in triplicate. For each determination, weigh from 0.5 g to 0.7 g of sample of material to be tested into a tared aluminum pan and record weight to 0.1 mg accuracy. Cover sample with 3 mL toluene. Place pans into a preheated convection oven at 110° C. for 60 minutes, then reweigh to give weight of residual solids. Calculate percent solids based on weight of residual solids.

Alternatively, percent solids is determined by thermogravimetric analysis (TGA) by placing 10 mg of sample into a standard thermogravimetric analysis unit that has a nitrogen gas purge. Heat the sample from 25° C. to 300° C. at a heating rate of 10° C. per minute (° C./min) From a graph of % weight loss as a function of time curve, use break in slope of the curve where the weight loss levels out as the percent (fraction of) solids.

Thickness of the coating: ASTM D7091-05 (Standard Practice for Nondestructive Measurement of Dry Film Thickness of Nonmagnetic Coatings Applied to Ferrous Metals and Nonmagnetic, Nonconductive Coatings Applied to Non-Ferrous Metals (2005)).

Hydroxyl number: Determined by following ASTM D4274-05 (Standard Test Methods for Testing Polyurethane Raw Materials: Determination of Hydroxyl Numbers of Polyols (2005)) and is expressed as number of milligrams of potassium hydroxide (KOH) per gram of test substance (mg KOH/g).

Gloss: Measurements are made with a BYK Labotron Gloss Unit following ASTM D523-08 (Standard Test Method for Specular Gloss (2008)).

Impact resistance: Determined using a Gardner impact tester and following ASTM D2794-93 (Standard Test Method for Resistance of Organic Coatings to the Effects of Rapid Deformation (Impact) (1993)).

Abrasion resistance: Using a Taber abrader (CS-17 wheels, 1000 g weights, 500 cycles).

Pendulum hardness: According to the Konig pendulum hardness test by following ANSI ISO1522 (Pendulum damping test).

Pencil hardness: ASTM D3363-05 (Standard Test Method for Film Hardness by Pencil Test (2005)).

Acid etch resistance: Determined by placing drops of a 10% solution of $H_2SO_4$ on a surface of a coating, waiting for 2 hours, observing visual effect on the coating and categorizing the visual effect as either no effect, moderate etch, or severe etch. No effect means no change to coating surface, moderate etch means whitening of the coating surface, and severe etch means blistering of the coatings surface.

Water resistance: (of a coating) Determined by placing drops of deionized water on a surface of a coating, covering the drops with a glass cover, waiting for 24 hours, observing visual effect on the coating, and categorizing the visual effect as either no effect, moderate etch, or severe etch. No effect means no change to coating surface, moderate etch means whitening of the coating surface, and severe etch means blistering of the coatings surface. Assign a relative rating of from 1 to 6, with 6 being highest water resistance and 1 being lowest water resistance, characterized as follows:
- 1=Cut through, dissolves coating, cracks/peels away.
- 2=Water corrodes substrate.
- 3=Severe blushing, forms bubbles/wrinkles
- 4=Mild blushing/yellowing, no change to touch.
- 5=No effect, visible or otherwise.
- 6=No effect, never even blushed.

Solvent resistance: (of a coating) Reported as the number of methyl ethyl ketone (MEK) double rubs that are required to remove enough of the coating down to and thereby exposing the surface of the substrate. Double rubs are 1 back-and-forth rub. The coating could be partially removed but not completely removed all the way to expose the substrate.

Solubility of the polyaldehyde in water: ASTM E1148-02 (Standard Test Method for Measurements of Aqueous Solubility (2002)).

Cross-hatch adhesion: ASTM D3359-09 (Standard Test Methods for Measuring Adhesion by Tape Test) (scale 0 B to 5 B with 5 B being the best adhesion).

PREPARATION EXAMPLES

Preparation 1

Preparation of an approximately 1:1 mixture of 1,3- and 1,4-cyclohexanedicarboxaldehydes, (P1). Follows the procedure of Example 8 of U.S. Pat. No. 6,252,121. A solution of rhodium dicarbonyl acetylacetonate and tris(2,4-bis(1,1-dimethylethylphenyl)phosphite (i.e. Ligand C) in hexane (20 grams) containing 300 parts per million rhodium with Ligand C/rhodium molar ratio of 20/1 is placed in a Parr reactor and activated for about 1 hour at 90° C. and 100 psi of syngas ($CO/H_2$, 1:1). Charge 1,2,3,6-tetrahydrobenzaldehyde (40 grams, prepared via a Diels Alder reaction 1,3-butadiene and acrolein) to the autoclave and hydroformylate at 90° C. and 100 psi of syngas. The $CO/H_2$ ratio is maintained 1:1 during the course of reaction. The reaction is continued until gas chromatographic analysis shows complete consumption of 1,2,3,6-tetrahydrobenzaldehyde. The selectivity to 1,3- and 1,4-cyclohexanedicarboxaldehyde product is more than 95%. The autoclave is cooled to ambient temperature, and the reaction mixture is discharged from the autoclave to give a two phase system. The upper heptane phase contains predominantly the catalyst and the ligand C, which can be recycled for hydroformylation of another batch of 1,2,3,6-tetrahydrobenzaldehyde if desired. The lower phase is separated, washed with heptane, and purified by distillation to give the about 1:1 mixture of (cis/trans)-1,3-cyclohexanedicarboxaldehyde and (cis/trans)-1,4-cyclohexanedicarboxaldehyde (P1).

Preparation 1a

Preparation of UNOXOL Diol initiated NOP, (P1a): Add 330.4 grams of methyl hydroxymethyl stearate, 72.4 grams of an approximately 1:1 mixture of 1,3 and 1,4-cyclohexanedimethanol (UNOXOL™ Diol), and 0.411 grams of dibutyltin oxide catalyst to a 500 milliliter five-neck round bottom glass flask equipped with a mechanical stirrer, condenser, addition funnel, nitrogen gas inlet, and a THERM-O-WATCHT™ sensor (Glas-Col, LLC, Terre Haute, Ind., USA) to monitor/control reaction temperature. Bring temperature of the mixture up to 150° C. with stirring using an external hot oil bath, and maintain at 150° C. for one hour. Then raise the temperature in 10° C. increments every 45 minutes until reaching a final reaction temperature of 200° C. Collect a total of 30 grams of methanol (90% of theoretical). Collect the resulting natural oil polyol (NOP) (P1a), which has a measured hydroxyl number of 136 mg KOH/g (P1a).

Preparation 1b

Preparation of 1,3/1,4-ADI trimer, (P1b):

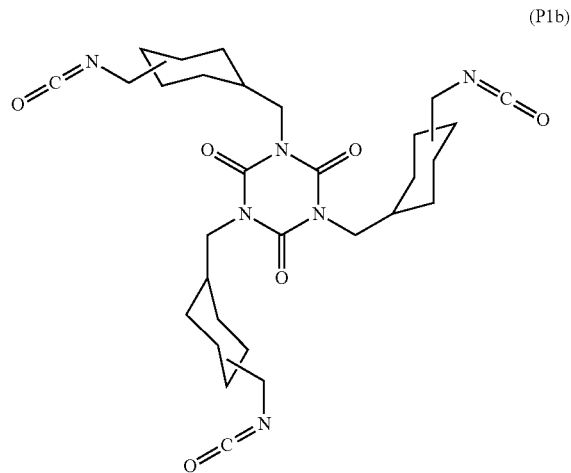

(P1b)

Prepare an approximately 1:1 aminomethyl mixture of (cis/trans)-1,3-bis(aminomethyl)cyclohexane and (cis/trans)-1,4-bis(aminomethyl)cyclohexane as described in U.S. Pat. No. 6,252,121. Alternatively obtain (cis/trans)-1,3-bis(aminomethyl)cyclohexane and (cis/trans)-1,4-bis(aminomethyl)cyclohexane from the Aldrich Chemical Company, and mix them together in an approximately 1:1 ratio. React the 1:1 aminomethyl mixture with 2 mole equivalents phosgene in an inert solvent such as dichloromethane in presence of a non-nucleophilic base such as triethylamine or sodium carbonate to give an approximately 1:1 isocyanatomethyls mixture of (cis/trans)-1,3-bisfisocyanatomethylicyclohexane and (cis/trans)-1,4-bisfisocyanatomethylicyclohexane (1,3/1,4-ADI) as in taught in US 2006/0155095 A1. Structures of the isomers of (cis/trans)-1,3-bis(isocyanatomethyl)cyclohexane and (cis/trans)-1,4-bisfisocyanatomethylicyclohexane are shown in paragraph [0012] of US 2006/0155095 A1.

Trimerize the (cis/trans)-1,3-bisfisocyanatomethylicyclohexane and (cis/trans)-1,4-bis(isocyanatomethyl)cyclohexane by following the procedure of Examples 32/33 of US 2006/0155095 A1. To a 1.8 L HASTELLOY™ (Haynes International, Inc., Kokomo, Ind., USA) reactor equipped with a gas bubbler, mechanical stirrer, thermometer and condenser add 1600 grams of 1, 3/1,4-ADI. Bubble dry nitrogen gas through the resulting stirred reaction mixture while heating it at 70° C. Add 2.8 grams of a 75% solution of N,N,N-trimethyl-2-hydroxypropylammonium 2-ethylhexanoate in ethylene glycol to the reaction mixture. Maintain reaction temperature between 70° C. and 75° C. Monitor the reaction mixture for NCO content as described herein. When the NCO content of the reaction mixture reaches 25%, stop the reaction by adding 1 g of chloroacetic acid. Separate excess 1, 3/1,4-ADI monomer in a short path distillation unit to provide a clear 1, 3/1,4-ADI Trimer. Dissolve the 1, 3/1,4-ADI Trimer in butyl acetate to obtain the 1, 3/1,4-ADI Trimer (1b) of Preparation 1b as a solution containing 30 wt % butyl acetate, an NCO content of 12%, and a free 1, 3/1,4-ADI monomer content of less than 0.5 wt %. Analysis of oligomer distribution indicates the solution contains a total of 29% 1, 3/1,4-ADI Trimer (1 isocyanurate ring structure), 20% of molecules containing two isocyanurate ring structures, and 51% higher molecular weight oligomers.

Preparation 2

Preparation of a Natural Oil dicarbamate, (P2): Into a system comprising a 3 necked 500 mL round bottom flask equipped with a mechanical stirrer, Dean-Stark trap, packed condenser (using glycol/water circulated at 65° C.), and a nitrogen gas bubbler system is placed the UNOXOL™ Diol initiated NOP (150 g, Preparation 1a), methyl carbamate (66.75 g), dibutyltin dilaurate (0.325 g), and toluene (25 mL) to give a reaction mixture. The system is flushed with nitrogen before heating. The reaction mixture is brought to 120° C. with a slow nitrogen sweep for 2 days, sampled periodically and analyzed for hydroxyl number until a hydroxyl number below 20 mg KOH/g is reached. Once the hydroxyl number below 20 mg KOH/g is reached, the packed condenser is replaced with a short path distillation head and nitrogen flow is increased to remove the toluene and any remaining methyl carbamate. The Natural Oil dicarbamate (P2) having a final hydroxyl number of 3.4 mg KOH/g (P2) is prepared.

Preparation 3

Preparation of N,N',N"-trisubstituted-cyanuric acid (P3) solution:

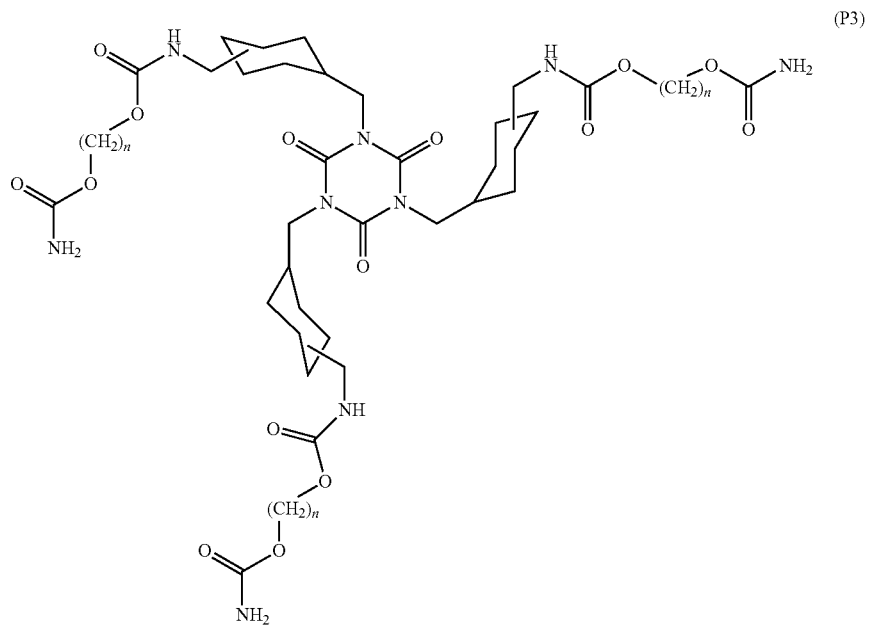

(P3)

wherein each cyclohexylene in (P3) independently is a 1,3-cyclohexylene or 1,4-cyclohexylene.

Into a system comprising a reaction flask equipped with a mechanical stirrer, and nitrogen bubbler system, a reflux condenser, a heating mantel with temperature controller and an addition funnel is placed 15.0 g 2-hydroxyethylcarbamate (0.142 mole), dibutyltin dilaurate (0.035 g, 0.055%) and 50 mL of dry N-methyl-2-pyrrolidine (NMP). The system is flushed with nitrogen. The addition funnel is charged with 51.1 g (0.142 moles —N═C═O) ADI trimer solution in n-butyl acetate (70% solids). The reaction flask is brought to 70° C., and the ADI trimer solution is slowly added while maintaining the reaction temperature below 80° C. After the addition is complete, the solution is stirred for 4 hours at 80° C. A percent isocyanate group (% NCO titration) is performed. The liquid reaction solution is kept at 80° C. till the %

NCO value is near zero or less that 5% of the initial isocyanate level as indicated by the % NCO titration. No further characterization is performed. The carbamate content is calculated based on the quantity of 2-hydroxyethylcarbamate added and the final weight of the reaction contents (1.17 mmol carbamate/g solution).

Preparation 4

Preparation of Desmophen™ A365 polycarbamate from acylic polyol, (P4): Into a system comprising a 3 necked 2000 mL round bottom flask equipped with a mechanical stirrer, Dean-Stark trap, condenser, and nitrogen bubbler system is placed Desmophen™ A365 acrylic polyol (Bayer Corp.) (500 g, 0.341 moles hydroxyl). The system is flushed with nitrogen before heating. The contents are brought to 150° C. to remove the butyl acetate solvent (butyl acetate b.p.: 126° C., expected about 146.25 mL). Methyl carbamate (96.0 g, 0.512 mole) and dibutyltin oxide catalyst (1.8 g, 0.30%) are added, and the system is flushed with nitrogen. Once the methyl carbamate has dissolved, the resulting reaction mixture is heated slowly to 145° C. The methanol produced is collected and the volume of the methanol collected is recorded. When the methanol is no longer being significantly generated, nitrogen is allowed to flow through the reaction flask, over the liquid contents, to drive the methanol and excess methyl carbamate from the reaction mixture. The reaction mixture is always kept at or below 150° C. Elimination of methyl carbamate is followed by carbon-13 nuclear magnetic resonance ($^{13}$C-NMR) in per-deuterated dimethyl sulfoxide (d6-DMSO). The heating at 150° C. is performed for 8 hours on a first day, the heating is stopped (heat source is turned off), and then on a second day the heating at 150° C. is continued for another 8 hours. After heating at 150° C. for the 8 hours on the second day, the reaction temperature is lowered to 100° C., and temperature is maintained there with the nitrogen passing over the reaction mixture until the $^{13}$C-NMR analysis shows that the methyl carbamate has been removed. During the removal of the methyl carbamate, if the viscosity of the resulting product is too high such that the product would be slow to pour, then add mixed xylenes to the reaction mixture lower the viscosity so that the product is satisfactorily pourable. This methyl carbamate removal step could take from 5 days to 7 days. A hydroxyl number titration validates conversion of hydroxyl groups to carbamate groups. On completion, (P4) is a liquid solution. A TGA is performed to determine the percent solids (2.12 mmol carbamate/g (P4) solution, adjusting for amount of solvent, 61% solids). No further characterization is performed. The carbamate content of the product is determined by subtraction the hydroxyl content of the final reaction product from the initial Desmophen™ A365 hydroxyl content which results in 2.12 mmol carbamate/g (P4) solution.

Preparation 5

Preparation of $PEG^{200,2}$ polycarbamate from polyether polyol, (P5): Into a system comprising a 3 necked 1000 mL round bottom flask equipped with a mechanical stirrer, Dean-Stark trap, condenser, and nitrogen bubbler system is placed: polyethylene glycol (weight average molecular weight 200 grams/mole (g/mol), 2 hydroxyl functionalities; "$PEG^{200,2}$ polyether") (250 g, 1.25 moles), methyl carbamate (281.5 g, 3.75 moles), and dibutyltin oxide (0.53 g, 0.1%) to give the reaction mixture. The system is flushed with nitrogen gas before heating. The temperature is slowly brought to 180° C. The methanol produced is collected and the volume collected is recorded. When the methanol is no longer being significantly generated, nitrogen gas is allowed to flow through the flask, over liquid contents, to drive the methanol and excess methyl carbamate from the reaction mixture. The elimination of methyl carbamate is followed by $^{13}$C-NMR in DMSO. The heating at 180° C. is performed for 8 hours on a first day, the heating is stopped (heat source is turned off), and then on a second day the heating at 180° C. is continued for another 8 hours. After heating at 180° C. for the 8 hours on the second day, the reaction temperature is lowered to 100° C. and this temperature is maintained with the nitrogen passing over the reaction media until the $^{13}$C-NMR analysis showed the methyl carbamate is removed. This step could take 5 days to 7 days. Cyanuric acid is observed as a side product (from a side reaction of three molecules of methyl carbamate) and methanol is observed as a byproduct. $PEG^{200,2}$ polyether-based polycarbamate (P5) is obtained as a liquid. Each molecule of $PEG^{200,2}$ polyether-based polycarbamate (P5) has two carbamate groups. No further characterization is performed. The carbamate content of the product is determined by subtraction the hydroxyl content of the final reaction product from the initial $PEG^{200,2}$ polyether hydroxyl content.

Preparations 6 to 11

Preparations of polycarbamate from polyether:
The procedure of Preparation 5 was repeated, except each time substituting for the $PEG^{200,2}$ polyether, the following:

Prep. 6

Polyethylene glycol (weight average molecular weight 1000 grams/mole (g/mol), 2 hydroxyl functionalities; "$PEG^{1000,2}$ polyether");

Prep. 7

Ethoxylated glycerin (IP 625; weight average molecular weight 625 grams/mole (g/mol), 3 hydroxyl functionalities; "ethoxylated glycerin$^{625,3}$ polyether");

Prep. 8

Polypropylene glycol (weight average molecular weight 425 grams/mole (g/mol), 2 hydroxyl functionalities; "$PPG^{425,2}$ polyether");

Prep. 9

Polypropylene glycol (weight average molecular weight 1000 grams/mole (g/mol), 2 hydroxyl functionalities; "$PPG^{1000,2}$ polyether");

Prep. 10

Polypropylene glycol Arch Chemical Company's Poly-G 30-400 T (weight average molecular weight 420 grams/mole (g/mol), 3 hydroxyl functionalities; "$PPG^{420,3}$ polyether"); or Prep. 11

Polypropylene glycol Arch Chemical Company's Poly-G 540-378 (weight average molecular weight 600 grams/mole (g/mol), 4 hydroxyl functionalities; "$PPG^{600,4}$ polyether")

Each preparation 6, 7, 8 9 and 10, respectively, gave about 90% conversion (by $^{13}$C-NMR spectroscopy and hydroxyl number characterization) to polycarbamate (. The carbamate content of the products were determined by subtraction the hydroxyl content of the final reaction product from the initial polyether polyol hydroxyl content.

Preparation 12

Preparation of polycarbamate from polycaprolactone, (P12): The Tone 0210 polyol (93.75 g), catalyst, dibutyltin dilaurate (0.1 g) and UNOXOL™ Diol (11.43 g) are placed into a three neck round bottom flask equipped with a condenser, overhead stirrer, addition funnel and a nitrogen bubbler system. Under a nitrogen purge, the mixture is heated to 80° C. and stirred at about 200 revolutions per minute (rpm) for 2 hours to remove any water from the starting materials. The resulting contents are cooled to 70° C. and the stirring rate is increased to 250 rpm. The aforementioned IPDI (82.31 g) is placed in the addition funnel and added dropwise. The exothermic reaction is controlled using an ice bath and the reaction temperature is kept at 80° C. After the addition of the IPDI is complete, the temperature of the reaction is kept at 80° C. for 4 hours. The flask is cooled to 68° C. and a —N=C=O titration is performed to determine the quantity of active —NCO groups. To the mixture is added 2-hydroxyethylcarbamate (26.74 g), and the resulting mixture is heated to 80° C. for 6 hours until —N=C=O titration shows no —N=C=O groups remain. Solvent MEK is added to lower the viscosity of the resulting product, (P12), to give a liquid solution of (P12) in MEK, (1.26 mmol carbamate/g solution). No further characterization is performed. Assume that all the 2-hydroxyethylcarbamate has reacted with the NCO groups and is incorporated into the polymer chains.

Preparation 13

Preparation of a polycarbamate from polyacrylic PARALOID™ AU-608X acrylic polyol: Into a system comprising a 3 necked 2000 mL round bottom flask equipped with a mechanical stirrer, Dean-Stark trap, condenser, and nitrogen bubbler system place PARALOID™ AU-608X acrylic polyol (1500 g, 1.334 moles hydroxyl), methyl carbamate (100.2 g, 1.334 mole) and dibutyltin oxide catalyst (4.8 g, 0.30%), and flush the system with nitrogen gas. Once the methyl carbamate has dissolved, heat the resulting reaction mixture slowly to 140° C. Collect and record volume of methanol produced. When methanol is no longer being significantly generated, flush reaction flask with nitrogen gas over the liquid contents to drive remaining methanol and excess methyl carbamate from the reaction mixture. Keep temperature of the reaction mixture at or below 140° C. The heating at 140° C. is performed for 8 hours on a first day, the heating is stopped (heat source is turned off), and then on a second day the heating at 140° C. is continued for another 8 hours with nitrogen gas passing over the reaction mixture. Carbon-13 nuclear magnetic resonance ($^{13}$C-NMR) in perdeuterated dimethyl sulfoxide (d6-DMSO) analysis shows that the methyl carbamate has been removed. During the removal of methanol and unreacted methyl carbamate, if the viscosity of the resulting mixture is too high such that the product would be slow to pour, then add mixed xylenes to the reaction mixture to lower the viscosity so that the product is satisfactorily pourable. Perform a hydroxyl number titration, which validates conversion of hydroxyl groups to carbamate groups (OH number=10 mg KOH/g). On completion, the polyacrylic-based polycarbamate of Preparation 13 is a liquid solution. Determine the carbamate content of the polyacrylic-based polycarbamate by subtracting the hydroxyl content thereof from the hydroxyl content of the starting PARALOID™ AU-608X acrylic polyol. Perform a TGA to determine the weight percent solids (0.974 mmol carbamate/g polyacrylic-based polycarbamate solution, adjusting for amount of solvent, 68.7 wt % solids).

Preparation 14

Preparation of a polycarbamate from an alkyd from DURAMAC™ 52-5205 short oil alkyd resin: Replicate the procedure of Preparation 14 except use 500 g, 0.936 moles hydroxyl) of DURAMAC™ 52-5205 instead of PARALOID™ AU-608X acrylic polyol, 70.2 g (0.936 mol) methyl carbamate, and 1.7 g (30%) of dibutyltin oxide to give mixture having methanol and excess methyl carbamate removed. During the removal of methanol and unreacted methyl carbamate, if the viscosity of the resulting product is too high such that the product would be slow to pour, then add methyl ethyl ketone to the cooled reaction mixture to lower the viscosity so that the product is satisfactorily pourable. Perform a hydroxyl number titration, which validates conversion of hydroxyl groups to carbamate groups (OH number=15 mg KOH/g). On completion, the alkyd-based polycarbamate of Preparation 14 is a liquid solution. The carbamate content of the polyacrylic-based polycarbamate was determined by subtracting the hydroxyl content thereof from the hydroxyl content of the starting alkyd-based polycarbamate, followed by performing a TGA to determine the percent solids (0.896 mmol carbamate/g alkyd-based polycarbamate solution, adjusting for amount of solvent, 39.5% solids).

In some embodiments the present invention provides the compound or product prepared in any one of the foregoing preparations.

EXAMPLE(S)

Examples 1a to 1f

Preparations of coatings with N,N',N''-trisubstituted-cyanuric acid (P3) and aqueous glutaraldehyde or aqueous glyoxal on steel substrates: In six separate experiments, mixed by hand were 20 g of N,N',N''-trisubstituted-cyanuric acid solution (P3) of Preparation 3, 1 g MEK solvent, 0.13 g of a 50 weight percent (wt %) trifluoroacid catalyst solution in MEK, and 2.46 g of either of a 50 wt % aqueous glutaraldehyde (Examples 1a, 1b, or 1c) or 1.78 g of a 40 wt % aqueous glyoxal (Examples 1d, 1e, or 1f) to give a mixture, and each of the resulting mixtures was applied to a surface of a steel plate using a standard draw down bar and cured at a cure temperature of 24° C., 60° C., and 140° C., respectively, for 7 days, 30 minutes, and 30 minutes, respectively, so as to produce three coatings of Examples 1a, 1b, and 1c, respectively, and three coatings of Examples 1d, 1e, and 1f, respectively.

Examples 1g to 1l

Preparations of coatings with polycarbamate from Desmophen™ A365 polyacrylic, (P4) and aqueous glutaraldehyde on steel substrates (Examples 1g, 1h, and 1i) or aqueous glyoxal on steel substrates (Examples 1j, 1k, and 1l): In six separate experiments, mixed by hand were equal equivalents (i.e. 1:1) amounts of 20 g of the Desmophen™ A365 polyacrylic-based polycarbamate solution (P4) of Preparation 4, 5 g methyl ethyl ketone (MEK), 0.14 g of a 50 weight percent (wt %) trifluoroacetic acid in MEK, and either 1.94 g of a 40 wt % aqueous glyoxal or 2.55 g of a 50 wt % aqueous glutaraldehyde, and each resulting mixture was applied to a steel plate and cured at a temperature of 24° C., 60° C., and 140° C., respectively, for 7 days, 30 minutes, and 30 minutes, respectively, so as to produce three coatings of Examples 1g, 1h, and 1i, respectively, and three coatings of Examples 1j, 1k, and 1l, respectively.

Example (Ex.) 2

Preparation of crosslinked polyurethane from the Natural Oil dicarbamate and a mixture of 1,3- and 1,4-cyclohexanedicarboxaldehydes: Mixed by hand were the Natural Oil dicarbamate (P2) (20.0 g) with an approximately 1:1 mixture of 1,3- and 1,4-cyclohexanedicarboxaldehydes (P1) (1.45 g) at room temperature. To the resulting stirred mixture was added 0.13 g of a 50 wt % dodecylbenzenesulfonic acid catalyst solution in MEK. Over a period of 1 hour at room temperature the resulting mixture thickened; and after 24 hours at room temperature it formed a crosslinked polyurethane of Example 2. This crosslinked polyurethane was a firm, rubbery mass that is substantially insoluble in NMP.

Example 3

Preparation of a crosslinked polyurethane of the present invention: Mixed by hand were 15 g of N,N',N''-trisubstituted-cyanuric acid solution (P3) of Preparation 3, 1.23 g of the mixture of 1,3- and 1,4-cyclohexanedicarboxaldehydes (P2) of Preparation 2, 3 g NMP solvent and 0.1 g of a 50 weight percent (wt %) dodecylbenzenesulfonic acid/NMP solution (gives reaction mixture having 0.3 wt. % catalyst), which was then cured at a cure temperature of 24° C. for 24 hours to give the crosslinked polyurethane of Example 3. Further curing at 24° C. for a total of 7 days gave a further cured crosslinked polyurethane of Example 3.

Examples 3a to 3h

Respective preparations of coatings of the present invention on steel substrates (Ex. 3a, 3b, and 3c) and wood substrates (Ex. 3d to 3h): Example 3 was repeated eight separate times except each time right after adding the dodecylbenzenesulfonic acid/NMP catalyst solution, the resulting curable mixture was applied to a steel plate or one of five poplar wood boards using a standard draw down bar and cured on the steel plate at a cure temperature of 24° C., 60° C., and 140° C., respectively, for 7 days, 30 minutes, and 30 minutes, respectively, so as to produce three coatings of Examples 3a, 3b, and 3c, respectively. On poplar wood board, the curable mixture was cured at a cure temperature of 24° C. for 1 day and 7 days, respectively, and 60° C. for 30 minutes, 2 hours, and 4 hours, respectively, so as to produce five coatings of Examples 3d, 3e, 3f, 3g, and 3h, respectively. Results of the characterizations of coating thickness, cross-hatch adhesion (coating on steel only), pendulum hardness (coating on steel only), MEK double rub (back-and-forth) resistance (coating on steel only), and water resistance are respectively shown in Table 1A, below.

Example 3aa-3dd

Preparation of a Comparative crosslinked polyurethane: Mixed by hand were 15 g of N,N',N''-trisubstituted-cyanuric acid solution (P3) of Preparation 3, 2.28 g of Cymel™ 303, 0.1 g 50 wt. % dodecylbenzene sulfonic acid solution in MEK and 2 g of NMP. In Example 3dd, the Cymel™ 303 was excluded. Each mixture was then coated on a steel substrate and independently cured under the varying conditions indicated in Table 1A, below.

Example 4

Preparation of a crosslinked polyurethane of the present invention from the mixture of 1,3- and 1,4-cyclohexanedicarboxaldehydes and Desmophen™ A365 polyacrylic-based polycarbamate (1:1): Mixed were equal equivalents (i.e. 1:1) amounts of 7.5 g of the Desmophen A365 polyacrylic-based polycarbamate solution (P4) of Preparation 4 and 1 g of the mixture of 1,3- and 1,4-cyclohexanedicarboxaldehydes (P1) of Preparation 1 along with 2 g methyl ethyl ketone (MEK) and 0.05 g of a 50 wt. % solution of dodecylbenzene sulfonic acid in MEK, followed by curing the resulting mixture at a cure temperature of 24° C. for 24 hours to give the crosslinked polyurethane of Example 4. Further curing at 24° C. for a total of 7 days gave a further cured crosslinked polyurethane of Example 4.

Examples 4a, 4b, 4c, 4d, 4e, 4f, 4g and 4h

Respective preparations of coatings of the present invention on steel substrates (Ex 4a, 4b, and 4c) and wood substrates (Ex. 4d to 4h): Example 4 was repeated eight separate times except each time right after adding the dodecylbenzenesulfonic acid/MEK catalyst solution, the resulting curable mixture was applied to a different steel plate or a different one of five poplar wood boards using a standard draw down bar and cured on the steel plate at a cure temperature of 24° C., 60° C., and 140° C., respectively, for 7 days, 30 minutes, and 30 minutes, respectively, so as to produce three invention coatings of Examples 4a, 4b, and 4c, respectively. The resulting layers on poplar wood board were cured at a temperature of 24° C. for 1 day and, 7 days, respectively, and at 60° C. for 30 minutes, 2 hours, and 4 hours, respectively, so as to produce five invention coatings of Examples 4d, 4e, 4f, 4g, or 4h, respectively. Results of the characterizations of coating thickness, cross-hatch adhesion (coating on steel only), pendulum hardness (coating on steel only), MEK double rub (back-and-forth) resistance (coating on steel only), and water resistance are respectively shown in Table 1B, below.

Example 4aa-4-dd

Preparation of a Comparative crosslinked polyurethane: Mixed by hand were 10 g Desmophen™ A365 polycarbamate: solution (P4), 2.47 g of Cymel™ 303, 0.08 g dodecylbenzene sulfonic acid solution (50 wt % in MEK) and 3 g MEK. In Example 4dd, the Cymel™ 303 was excluded. Each mixture was then coated on a steel substrate and independently cured under the varying conditions indicated in Table 1B, below.

Example 5

Preparation of a crosslinked polyurethane of the present invention from the mixture of 1,3- and 1,4-cyclohexanedicarboxaldehydes (P1) and $PEG^{200,2}$ polyether-based polycarbamate: The procedure of Example 4 was repeated except substituting for the Desmophen A365 polyacrylic-based polycarbamate a $PEG^{200,2}$ polyether-based polycarbamate (P5) of Preparation 5, and curing the resulting mixture at a cure temperature of 24° C. for 24 hours to give the crosslinked polyurethane of Example 5. In particular, into a beaker was placed 15 g of the $PEG^{200,2}$ polyether-based polycarbamate (P5), 7.24 g of the mixture of 1,3- and 1,4-cyclohexanedicarboxaldehydes (P1) of Preparation 1, 0.13 g of the 50 wt. % solution of dodecylbenzene sulfonic acid catalyst in MEK and 3 g of MEK solvent. Further curing at 24° C. for a total of 7 days gave a further cured crosslinked polyurethane of Example 5.

Examples 5a to 5c

Respective preparations of coatings of the present invention on steel substrates (Ex. 5a, 5b, and 5c): Examples 4a to 4c were repeated, except substituting for the Desmophen™ A365 polyacrylic-based polycarbamate a $PEG^{200,2}$ polyether-based polycarbamate of Preparation 5. Each time right after adding the dodecylbenzenesulfonic acid/MEK solution, the resulting curable mixture was applied to a steel plate using a standard draw down bar and cured at a cure temperature of 24° C., 60° C., and 140° C., respectively, for 7 days, 30 minutes, and 30 minutes, respectively, so as to produce three coatings of Examples 5a, 5b, and 5c, respectively. Results of the characterizations of coating thickness, cross-hatch adhesion (coating on steel only), pendulum hardness (coating on steel only), MEK double rub (back-and-forth) resistance (coating on steel only), and water resistance are respectively shown in Table 1C, below.

Examples 6 to 11

Preparation of a crosslinked polyurethane of the present invention from the mixture of 1,3- and 1,4-cyclohexanedicarboxaldehydes and polyether-based polycarbamates: Example 5 was repeated six separate times (one time each for Examples 6 to 11) except substituting for the $PEG^{200,2}$ polyether-based polycarbamate (P5) each of: The $PEG^{1000,2}$ polyether-based polycarbamate (P6) of Preparation 6; the ethoxylated glycerin$^{625,3}$ polyether-based polycarbamate (P7) of Preparation 7; the $PPG^{425,2}$ polyether-based polycarbamate (P8) of Preparation 8; the $PPG^{1000,2}$ polyether-based polycarbamate (P9) of Preparation 9; the $PPG^{420,3}$ polyether-based polycarbamate (P10) of Preparation 10; and the $PPG^{600,4}$ polyether-based polycarbamate (P11) of Preparation 11. Each resulting mixture was cured at a cure temperature of 24° C. for 24 hours to give the respective crosslinked polyurethane of Example 6, 7, 8, 9, 10, or 11. Further curing at 24° C. for a total of 7 days gave a cured crosslinked polyurethane of Example 6, 7, 8, 9, 10, or 11.

Examples 8a to 8c

Each of the procedures of Examples 4a to 4c was repeated, except substituting for the Desmophen A365 polyacrylic-based polycarbamate a $PPG^{425,2}$ polyether-based polycarbamate (P8) of Preparation 8. Each time right after adding the dodecylbenzenesulfonic acid/MEK solution, the resulting curable mixture was applied to a steel plate using a standard draw down bar and was cured at a cure temperature of 24° C., 60° C., and 140° C., respectively, for 7 days, 30 minutes, and 30 minutes, respectively, so as to produce three invention coatings of Examples 8a, 8b, and 8c, respectively. Results of the characterizations of coating thickness, cross-hatch adhesion (coating on steel only), pendulum hardness (coating on steel only), MEK double rub (back-and-forth) resistance (coating on steel only), and water resistance are respectively shown in Table 1C, below.

Examples 10a, 10b, and 10c

Each of the procedures of Examples 4a to 4c was repeated, except substituting for the Desmophen A365 polyacrylic-based polycarbamate a $PPG^{420,3}$ polyether-based polycarbamate (P10) of Preparation 10. Each time right after adding the dodecylbenzenesulfonic acid/MEK solution, the resulting curable mixture was applied to a steel plate using a standard draw down bar, and cured at a cure temperature of 24° C., 60° C., and 140° C. for 7 days, 30 minutes, and 30 minutes, respectively, so as to produce three invention coatings of Examples 10a, 10b, and 10c, respectively. Results of the characterizations of coating thickness, cross-hatch adhesion (coating on steel only), pendulum hardness, MEK double rub (back-and-forth) resistance, and water resistance are respectively shown in Table 1C, below.

Examples 11a, 11b and 11c

Each of the procedures of Examples 4a to 4c was repeated, except substituting for the Desmophen A365 polyacrylic-based polycarbamate a $PPG^{600,4}$ polyether-based polycarbamate (P11) of Preparation 11. Each time right after adding the dodecylbenzenesulfonic acid/MEK solution, the resulting curable mixture was applied to a steel plate using a standard draw down bar and was cured at a cure temperature of 24° C., 60° C., or 140° C., respectively, for 7 days, 30 minutes, or 30 minutes, respectively, so as to produce three coatings of Examples 11a, 11b, and 11c, respectively. Results of the characterizations of coating thickness, cross-hatch adhesion (coating on steel only), pendulum hardness (coating on steel only), MEK double rub (back-and-forth) resistance (coating on steel only), and water resistance are respectively shown in Table 1C, below.

Example 12

Crosslinked polyurethane of the present invention from the mixture of 1,3- and 1,4-cyclohexanedicarboxaldehydes and polycaprolactone-based polycarbamate: The procedure of Example 4 was repeated except substituting for the Desmophen A365 polyacrylic-based polycarbamate a polycaprolactone-based polycarbamate (P12) of Preparation 12, and curing the resulting mixture at a cure temperature of 24° C. for 24 hours to give the crosslinked polyurethane of Example 12. In particular, into a beaker was mixed 15 g of the polycaprolactone-based polycarbamate (P12) of Preparation 12, 1.32 g of the mixture of 1,3- and 1,4-cyclohexanedicarboxaldehydes (P1) of Preparation 1, 0.1 g of a 50 wt. % solution of dodecylbenzene sulfonic acid in MEK (giving a reaction mixture having 0.3 wt. % catalyst), and 5 g of MEK solvent. Further curing at 24° C. for a total of 7 days gave a cured crosslinked polyurethane of Example 12.

Examples 12a, 12b, and 12c

Each of the procedures of Examples 4a to 4c was repeated except substituting for the Desmophen A365 polyacrylic-based polycarbamate a polycaprolactone-based polycarbamate (P12) of Preparation 12. Each time right after adding the dodecylbenzenesulfonic acid/MEK solution, the resulting curable mixture was applied to a steel plate using a standard draw down bar, followed by curing at a cure temperature of 24° C., 60° C., and 140° C., respectively, for 7 days, 30 minutes, and 30 minutes, respectively, so as to produce three coatings of Examples 12a, 12b, and 12c, respectively. Results of the characterizations of coating thickness, cross-hatch adhesion (coating on steel only), pendulum hardness (coating on steel only), MEK double rub (back-and-forth) resistance (coating on steel only), and water resistance are respectively shown in Table 1D, below.

Coating thickness data in Table 1 are expressed in mils and parenthetically in micrometers (1 mil is one thousandth of an inch or 25.4 µm). Pendulum (Konig) hardness data in Table 1 are expressed in seconds, wherein higher number of seconds means greater pendulum hardness. Resistance to solvent, i.e., MEK double rubs data in Table 1 are expressed as number of MEK double rubs (back-and-forth) before coating is penetrated to substrate, wherein higher number of MEK double rubs means greater MEK double rub resistance. Water resistance data in Table 1 are expressed as a qualitative value ranking on a scale of from 1 to 6, wherein 1 is lowest water resistance and 6 is highest water resistance. Cross-hatch adhesion data in Table 1 are expressed as a qualitative value ranking on a scale of from 0 B to 5 B, wherein 0 B is lowest cross-hatch adhesion and 5 B is highest cross-hatch adhesion. The data are generated using the previously described pendulum hardness, MEK double rub, water resistance, and cross-hatch adhesion test methods. In Table 1, hyphens are used to fit text to columns; "Ex." means Example; and "No." means Number.

TABLE 1A

Coating Properties Of Crosslinked Polyurethane Coatings from a Trifunctional Polycarbamate from N,N',N''-trisubstituted-Cyanuric acid

| Ex. | Coating Thickness (µm) | Cure Temp. (° C.)/Time (min., hr., day) | Pendulum Hardness (Konig seconds) | MEK Double Rubs | Water Resistance | Cross-hatch adhesion |
|---|---|---|---|---|---|---|
| 3a | 50.3 | 24° C./7 days | 46 | 75 | 1 | 0B |
| 3b | 25.4 | 60° C./30 min. | 186 | >200 | 1 | 0B |
| 3c | 37.8 | 140° C./30 min. | 202 | >200 | 6 | 5B |
| 3d | N/d* | 24° C./1 day | N/t** | N/t | 3 | N/t |
| 3e | N/d | 24° C./7 days | N/t | N/t | 5 | N/t |
| 3f | N/d | 60° C./30 min. | N/t | N/t | 4 | N/t |
| 3g | N/d | 60° C./2 hr. | N/t | N/t | 4.5 | N/t |
| 3h | N/d | 60° C./4 hr. | N/t | N/t | 5 | N/t |
| 3aa | 36.8 | 24° C./7 days | 19 | 15 | 1 | 3B |
| 3bb | 19.8 | 60° C./30 min. | 113 | 20 | 3 | 0B |
| 3cc | 27.2 | 140° C./30 min. | 190 | >200 | 6 | 0B |
| 3dd | 39.6 | 24° C./7 days | 39 | 25 | 1 | 5B |

3aa, 3bb, 3cc and 3dd are Comparative;
*N/d: Not determined;
**N/t: Not tested.

As shown in Table 1A, above, the coatings of Examples 3a, 3b, 3c, 3d, 3e, 3f, 3g and 3h gave good to excellent MEK double rub results or good to excellent water resistance to exhibit crosslinking at very low cure temperatures. In comparison, a melamine crosslinked coating in Comparative Examples 3aa, 3bb and 3 cc required a 140° C. cure to give good crosslinking Example 3dd had no crosslinker.

As shown in Table 1B, below, the coatings of Examples 4a, 4b, 4c, 4d, 4e, 4f, 4g and 4h made from a polycarbamate having about a 7.1 carbamate functionality gave good to excellent MEK double rub results or good to excellent water resistance to exhibit crosslinking at very low cure temperatures. In comparison, a melamine crosslinked coating in Comparative Examples 4aa, 4bb and 4 cc required a 140° C. cure to give good crosslinking Example 4dd had no crosslinker

TABLE 1B

Coating Properties Of Crosslinked Polyurethane Coatings from a Polyfunctional Polycarbamate from Acrylic Polyol (Desmophen ™ A365)

| Ex. | Coating Thickness (µm) | Cure Temp. (° C.)/Time (min., hr., day) | Pendulum Hardness (Konig seconds) | MEK Double Rubs | Water Resistance | Cross-hatch adhesion |
|---|---|---|---|---|---|---|
| 4a | 20 | 24° C./7 days | 160 | 70 | 5 | 0B |
| 4b | 25.9 | 60° C./30 min. | 188 | 100 | 5 | 0B |
| 4c | 22 | 140° C./30 min. | 217 | >200 | 6 | 3B |
| 4d | N/d* | 24° C./1 day | N/t** | N/t | 5 | N/t |
| 4e | N/d | 24° C./7 days | N/t | N/t | 5 | N/t |
| 4f | N/d | 60° C./30 min. | N/t | N/t | 5 | N/t |
| 4g | N/d | 60° C./2 hr. | N/t | N/t | 5 | N/t |
| 4h | N/d | 60° C./4 hr. | N/t | N/t | 5 | N/t |
| 4aa | — | 24° C./7 days | — | — | — | — |
| 4bb | 26.2 | 60° C./30 min. | 19 | 5 | 3 | 3B |
| 4cc | 29.7 | 140° C./30 min. | 192 | >200 | 6 | 0B |
| 4dd | 49.8 | 24° C./7 days | 29 | 10 | 4 | 0B |

4aa, 4bb, 4cc and 4dd are Comparative;
*N/d: Not determined;
**N/t: Not tested.

TABLE 1C

Coating Properties Of Crosslinked Polyurethane Coatings from Polycarbamates of Varying Functionalities Made from Polyether Polyols

| Ex. | Coating Thickness (µm) | Cure Temp. (° C.)/Time (min., hr., day) | Pendulum Hardness (Konig seconds) | MEK Double Rubs | Water Resistance | Cross-hatch adhesion |
|---|---|---|---|---|---|---|
| 5a | 42.4 | 24° C./7 days | 5 | 100 | 1 | 4B |
| 5b | 68.6 | 60° C./30 min. | 15 | >200 | 1 | 5B |
| 5c | 45.2 | 140° C./30 min. | 34 | >200 | 1 | 5B |
| 8a | 14 | 24° C./7 days | 5 | 5 | 1 | 5B |
| 8b | 21 | 60° C./30 min. | 4 | 30 | 1 | 5B |
| 8c | 22 | 140° C./30 min. | 30 | 3 | 1 | 4B |
| 10a | 21 | 24° C./7 days | 187 | 110 | 3 | 0B |
| 10b | 48.5 | 60° C./30 min. | 199 | >200 | 4 | 0B |
| 10c | 28.4 | 140° C./30 min. | 177 | >200 | 4 | 4B |
| 11a | 36.3 | 24° C./7 days | 186 | >200 | 2 | 0B |
| 11b | 38.1 | 60° C./30 min. | 213 | >200 | 2 | 0B |
| 11c | 31.8 | 140° C./30 min. | 210 | >200 | 6 | 4B |

As shown in Table 1C, above, the coatings of Examples 10a, 10b, 10c from a trifunctional polycarbamate and of Examples 11a, 11b, and 11c made from tetrafunctional polycarbamates gave good to excellent MEK double rub results, good pendulum hardness and fair to excellent water resistance to exhibit crosslinking at very low cure temperatures. This is excellent performance considering that the polycarbamates were made from polyether polyols which are expected to confer poor water resistance and hardness properties. In comparison, a crosslinked coating in Examples 5a, 5b, 5c, 8a, 8b, and 8c made from dicarbamate polycarbamates gave poor water resistance and pendulum hardness.

TABLE 1D

Coating Properties Of Crosslinked Polyurethane Coatings from Polycarbamates of Varying Functionalities Made from polycaprolactone-based polycarbamates

| Ex. | Coating Thickness (µm) | Cure Temp. (° C.) and Time (min., hr., day) | Pendulum Hardness (Konig seconds) | MEK Double Rubs | Water Resistance | Cross-hatch adhesion |
|---|---|---|---|---|---|---|
| 12a | 65.3 | 24° C./7 days | 20 | 30 | 3 | 1B |
| 12b | 48.0 | 60° C./30 min. | 82 | 70 | 4 | 5B |
| 12c | 36.6 | 140° C./30 min. | 84 | 40 | 4 | 4B |

As shown in Table 1D, above, the coatings of Examples 12a, 12b, 12c from a difunctional polycarbamate gave poor to fair MEK resistance and poor pendulum hardness even at a 140° C. cure.

Not shown herein, the coatings of the Examples were further characterized by 20 degree gloss, 60 degree gloss, pencil hardness (gouge), fingernail mar test (pass or fail), impact resistance (direct, inch-pounds), Micro Mar resistance, scratch resistance, or a combination thereof.

Examples 13a to 13d

Decoupling pot life from coating drying time and hardness: 7.5 g AU608 carbamate (62% in xylene; prepared by reaction of methyl carbamate with PARALOID™ AU608 polyol), 4.76 g curing inhibitor (Examples 13a to 13d), and 0.091 g para-dodecylbenzenesulfonic acid solution (10 wt % in isopropanol (IPA)) using a FlackTek speed mixer DAC 150 FVZ-K were mixed. Then 0.47 g of a mixture of (cis,trans)-1,4-cyclohexanedicarboxyaldehydes and (cis,trans)-1,3-cyclohexanedicarboxyaldehyde (P1) was added to the mixture, and mixed by speed mixer at 2,000 rpm for 1 minute. Viscosity of the resulting formulation was measured with a Brookfield viscometer DV-III and pot life is defined as the time for viscosity to reach 900 centipoise (cP). Prepare coatings by draw down of the formulation on aluminum substrates with a wire wound rod (#50). Dry to touch time is the minimum amount time required for the coating to dry enough that no mark is left after touched by a cotton swab under light pressure. Martens hardness of the coatings was measured by micro-indenter Fischerscope HM 2000 in Newtons per square millimeter (N/mm$^2$) As a comparison, the foregoing procedure was repeated using a hydrocarbon solvent xylene (Example 13e) instead of the curing inhibitor to give the invention multicomponent composition. Table 2, below, shows the decoupling of pot life and dry to touch time/hardness development by curing inhibitors.

TABLE 2

Effect of Curing Inhibitors

| Ex. No. | Curing Inhibitor | Pot life (hours) | Dry to touch time (hours) | Martens hardness (N/mm$^2$) | | | |
|---|---|---|---|---|---|---|---|
| | | | | 2 days | 5 days | 7 days | 10 days |
| 13a | Butyl acetate | 12.9 | 4 | 44 | 95 | 113 | 121 |
| 13b | MEK | 13.1 | 4 | 39 | 78 | 98 | 119 |
| 13c | Acetone | 13.3 | 4 | | 56 | 80 | 106 |
| 13d | Isopropanol | 336 | 4.5 | N/d | N/d | N/d | N/d |
| 13e | Xylene* | 4.9 | 4 | 24 | 52 | 88 | 100 |

N/d means not determined;
*is comparative.

Examples 13a to 13d show that carboxylic esters, ketones and alcohols function as curing inhibitors to decouple pot life of the multicomponent composition from its drying time to touch and hardness of coatings or films prepared therefrom. As shown in Table 2, above, Example 13d shows that isopropanol dramatically improves pot life without significantly impairing dry time. Example 13e shows that xylene can be used as an organic solvent but is not effective as a curing inhibitor in the multicomponent composition.

In Examples 14a to 14c

Example 13e was replicated three times except that further added was, respectively, 0.68 g methanol (Example 14b) and ethanol (Example 14c). As shown in Table 3, below, alcohol curing inhibitors, even in small amounts, dramatically increase the pot life of a composition without impairing its dry to touch time/hardness development. Example 14a shows that xylene can be used as an organic solvent but not as a curing inhibitor in the compositions of the present invention.

TABLE 3

Effect of Curing Inhibitors

| Ex. No. | Curing Inhibitor | Pot life (hours) | Dry to touch time (hours) | Martens hardness (N/mm$^2$) | | | |
|---|---|---|---|---|---|---|---|
| | | | | 2 days | 4 days | 7 days | 10 days |
| 14a | Xylene* | 4.9 | 4 | 24 | 67 | 88 | 100 |
| 14b | methanol | 160 | 4 | 32 | 81 | 98 | 109 |
| 14c | ethanol | 300 | 4 | 42 | 84 | 100 | 109 |

*comparative

Example 15

Improved adhesion and flexibility of coatings containing pigment. The multicomponent composition shown in Table 4, below, was prepared and coated on aluminum by drawdown as described previously, and determine flexibility (Mandrel Bend) according to ASTM D522-93a and adhesion of dried and water wetted coatings according to ASTM D3359-09e2 and ASTM D3359-09e2 modified so as to test after exposure to water for 24 hours. Results are shown below in Table 5.

TABLE 4

Pigmented Multicomponent Composition

| Raw material | Clear Coating (wt %) | White Coating (wt %) |
|---|---|---|
| Acrylic polycarbamate (P13) | 38.4 | 35.17 |
| para-toluenesulfonic acid | 0.01 | 0.01 |
| Xylene | 23.53 | 21.55 |
| n-Butyl acetate | 31 | 28.33 |
| Isopropanol | 0.02 | 0.02 |
| n-Butanol | 3.1 | 2.82 |
| Titanium Dioxide (pigment) | None | 8.5 |
| UNOXOL ™ dialdehyde | 3.94 | 3.61 |

TABLE 5

Flexibility And Adhesion Improvements,
Direct To Metal Application

| Test | Clear Coating | White Coating |
|---|---|---|
| Mandrel Bend | Fail 1 inch | Pass up to ⅛ inch |
| Adhesion, Dry | 3B | 5B |
| Adhesion, Water wetted | 1B | 3B |

Adhesion 5B is greatest, 0B is least.

As shown in Table 5, above, Example 15 shows that pigment improves flexibility and adhesion of coatings or films prepared from the multicomponent composition containing the pigment compared to the same multicomponent composition except lacking the pigment when the coatings or films are applied to on metal substrates.

Example 16

Crosslinked polyurethane and coating comprising same on aluminum: A polyacrylic-based polycarbamate (Preparation 13) and a mixture of 1,3- and 1,4-cyclohexanedicarboxaldehydes (P1) on aluminum substrates were prepared by mixing well equal molar equivalents (i.e., 1:1) amounts of 10 g of the polyacrylic-based polycarbamate solution, 0.682 g of 1,3- and 1,4-cyclohexanedicarboxaldehydes, 0.26 g of a 25 wt % dodecylbenzenesulfonic acid (DDBSA) solution in methyl ethyl ketone (MEK), and 4 g MEK to give a reaction mixture having 0.6 wt. % DDBSA relative to polyacrylic-based polycarbamate and 1,3- and 1,4-cyclohexanedicarboxaldehydes. The resulting mixture was applied to a surface of an aluminum plate using a draw down bar or rod to give a layer thereon, followed by curing the resulting layer at a cure temperature of 24° C. for 7 days so as to produce the coating of Example 16. The procedure was repeated two times except using ether a steel plate or wood substrate instead of the aluminum substrate. Results of the tests are recorded in Table 6, below.

Example 17

Crosslinked polyurethane and coating comprising same on wood: The procedure of Example 16 was repeated except using poplar wood boards (¼"×4"×48" cut down to 5" lengths) instead of aluminum and the mixture was applied with a paint brush instead of the draw down bar to give coated wood boards comprising a coating, followed by heating the coated boards in an oven at 60° C. for 30 minutes. The following was repeated two times to give a thrice coated wood board: lightly sand the coating, apply additional mixture to the lightly sanded coating, and heat in an oven at 60° C. for 30 minutes. The thrice coated boards were allowed to dry at room temperature for 7 days and then were exposed to 4 drops of test liquid as follows: To a 13 mm absorbent paper disk on the surface of the coating was applied 4 drops of test liquid, and then the disk was covered with a plastic bottle cap for 24 hours to minimize evaporation of the test liquid. The test liquid tested were WINDEX™ Original with Ammonia-D cleaner (an aqueous ammonia cleaning fluid from S.C. Johnson & Son, Inc., Racine, Wis.), water, 50% aqueous ethanol, and SKYDROL™ LD4 hydraulic fluid (a fire resistant hydraulic fluid comprising tributyl phosphate (58.2 wt %), dibutylphenylphosphate (20.0-30.0 wt %), butyldiphenylphosphate (5.0-10.0 wt %), 2-ethylhexyl-7-oxabicyclo[4.1.0]heptane-3-carboxylate (≤10 wt %), and 2,6-di(tert-butyl)-para-cresol (1.0-5.0 wt %) from Solutia Inc., St. Louis, Mo., USA) for a period of 24 hours. After the 24 hours, the wood surface was visually inspected for the degree of damage and resistance to each of the test liquids.

Example 18

Crosslinked polyurethane and coating comprising same on aluminum: The procedure of Example 16 was replicated except using the alkyd-based polycarbamate (Preparation 14) instead of the polyacrylic-based polycarbamate (Preparation 13). Results of the tests are recorded in Table 6, below.

Example 19

Crosslinked polyurethane and coating comprising same on wood: The procedure of Example 18 was repeated using the alkyd-based polycarbamate (Preparation 14) instead of the polyacrylic-based polycarbamate (Preparation 13) to give thrice coated wood boards. To test: Expose the coated and dried boards to 4 drops of test liquid as follows: place a 13 mm absorbent paper disk on the surface of the coating, apply the 4 drops of test liquid to the disk, and cover the disk using a plastic bottle cap for 24 hours to minimize evaporation of the test liquid. The test liquids tested were WINDEX™ Original with Ammonia-D, water (deionized), 50% aqueous ethanol, and SKYDROL™ LD4 for a period of 24 hours. After the 24 hours, the wood surface was visually inspected for the degree of damage and determine resistance to each of the test liquids.

TABLE 6

Wood Coating Test Results

| Ex. No. | Coating thickness (μm) | Cure temp. (° C.)/ Time | Pendulum Hardness (Konig, seconds) | No. of MEK Double Rubs | Water resistance (from 1 to 6) | Cross-hatch adhesion (0B to 5B) |
|---|---|---|---|---|---|---|
| 16 | 52.8 | 24° C./7 days | 168 | 200 | 6 | 1B |
| 18 | 21.8 | 24° C./7 days | 198 | 100 | 5 | 3B |

As shown in Table 6, above, use of the polyaldehyde made from the mixture of 1,3- and 1,4-cyclohexanedicarboxaldehydes in Examples 16 and 18 provides a number of unexpected advantages, including increased water resistance. In addition, the combination of the polyaldehyde and a polyfunctional polycarbamate in Examples 16 and 18 enables room temperature cure that produces a polyurethane having good to excellent MEK solvent resistance, and, accordingly, a high level of crosslinking.

We claim:
1. A substantially isocyanate-free and substantially formaldehyde free multicomponent composition comprising a polycarbamate having an average of 2.5 or more carbamate functional groups as a first component and a polyaldehyde, which polyaldehyde is a dialdehyde, a trialdehyde or an acetal or hemiacetal thereof having from 2 to 20 carbon atoms as a second component, wherein the multicomponent composition futher comprises an effective amount of a trigger a gent such that the first and second components when combined form a composition that react to cure at a temperature of from 0° C to less than 80° C to form a crosslinked polyurethane and a curing inhibitor chosen from water, an alcohol or a mixture thereof, and, further wherein, the composition resulting when all components of the multicomponent composition are combined has a pH of 7.0 or less.

2. A substantially isocyanate-free and substantially formaldehyde free multicomponent composition comprising a polycarbamate having an average of 2.5 or more carbamate functional groups as a first component and a polyaldehyde chosen from (cis,trans)-1,4-cyclohexanedicarboxyaldehydes, (cis,trans)-1,3-cyclohexanedicarboxyaldehydes and mixtures thereof as a second component, wherein the multicomponent composition further comprises an effective amount of a triggering agent such that the first and second components when combined form a composition that reacts to cure at a temperature of from 0 C to less than 80° C to form a crosslinked polyurethane, and, further wherein, the composition resulting when all components of the multicomponent composition are combined has a pH of 7.0 or less.

3. The multicomponent composition as in claim 1, wherein the triggering agent is an acid with a pKa of less than 6.0 or a Lewis Acid.

4. The multicomponent composition as in claim 1, wherein the polycarbamate is the condensation product of one or more polyols with an unsubstituted carbamic acid alkyl ester or urea.

5. The multicomponent composition as in claim 4, wherein the polyol is an acrylic, saturated polyester, alkyd, polyether or polycarbonate.

6. The multicomponent composition as in claim 5, wherein the polycarbamate of the first component has carbamate groups and hydroxyl groups in a ratio of the equivalents of carbamate groups to the number of equivalents of hydroxyl functional groups of from 1:1 to 20:1.

7. The multicomponent composition as claimed in claim 1, further comprising from 3 to 20 wt.%, based on the total weight of solids in the composition, of a pigment for increasing flexibility, adhesion, or both of a cured and dried coating prepared therefrom.

8. A process for preparing a crosslinked polyurethane comprising mixing a polycarbamate having an average of 2.5 or more carbamate functional groups as a first component and a polyaldehyde, which polyaldehyde is a dialdehyde, a trialdehyde or an acetal or hemiacetal thereof having from 2 to 20 carbon atoms as a second component to form an ambient temperature curable composition having a pH of 7.0 or less, and curing the resulting composition at a temperature of from 0° C to less than 80° C, wherein the ambient temperature curable composition has an effective amount of a triggering agent and has a curing inhibitor chosen from water, an alcohol or a mixture thereof.

9. The crosslinked polyurethane of claim 8 which has at least one geminal bis(urethane) group.

\* \* \* \* \*